(12) United States Patent
Obata et al.

(10) Patent No.: US 6,964,056 B2
(45) Date of Patent: Nov. 8, 2005

(54) DISK TYPE RECORDING AND REPRODUCING DEVICE

(75) Inventors: Manabu Obata, Kanagawa (JP);
Mitsunori Matsumura, Tokyo (JP);
Yoichiro Mitsumoto, Tokyo (JP);
Hideaki Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 10/415,221

(22) PCT Filed: Jun. 28, 2002

(86) PCT No.: PCT/JP02/06609

§ 371 (c)(1),
(2), (4) Date: Apr. 25, 2003

(87) PCT Pub. No.: WO03/021594

PCT Pub. Date: Mar. 13, 2003

(65) Prior Publication Data

US 2004/0013071 A1 Jan. 22, 2004

(30) Foreign Application Priority Data

Aug. 28, 2001 (JP) .......................................... 2001-257125

(51) Int. Cl.⁷ .............................................. G11B 17/04
(52) U.S. Cl. ..................................................... 720/616
(58) Field of Search ........................................ 720/616

(56) References Cited

U.S. PATENT DOCUMENTS

| 5,812,511 A | * | 9/1998 | Kawamura et al. | 720/616 |
| 6,473,260 B1 | * | 10/2002 | Seo et al. | 720/616 |
| 6,504,808 B2 | * | 1/2003 | Wada et al. | 720/616 |
| 6,584,055 B1 | * | 6/2003 | Morimoto et al. | 720/616 |

FOREIGN PATENT DOCUMENTS

| JP | 4-95224 | | 3/1992 |
| JP | 7-240084 | | 9/1995 |
| JP | 9-282671 | | 10/1997 |
| JP | 11-219557 | | 8/1999 |
| JP | 11219557 A | * | 8/1999 |
| JP | 2000-228017 | | 8/2000 |

* cited by examiner

*Primary Examiner*—Tianjie Chen
(74) *Attorney, Agent, or Firm*—Frommer Lawrence & Haug LLP; William S. Frommer

(57) ABSTRACT

Disclosed is a disk recording and reproduction apparatus for recording and/or reproduction of optical disks of multiple different formats impossible to record or reproduce with a single pickup. A disk recording and reproduction apparatus containing a base unit (25) with two separate optical pickups (31) and (32) corresponding to two different format types and installed around the center of a turntable (27) for rotating a disk.

4 Claims, 23 Drawing Sheets

DISK TYPE RECORDING AND REPRODUCING DEVICE

TECHNICAL FIELD

The present invention relates to a disk recording and reproduction apparatus and relates in particular to a disk recording and reproduction apparatus for recording and/or reproduction by using a pickup while rotating a disk recording medium.

BACKGROUND ART

Disk recording and reproduction devices are widely used to perform recording or reproduction by utilizing an optical pickup while rotating a disk recording medium. In this technology of the prior art, an optical disk constituting the disk recording medium is accessed by an optical pickup by rotating the optical disk on a turntable and moving the optical pickup along the radius direction of the optical disk, and the specified recording or reproduction is performed.

The laser light wavelength of the optical pickup varies according to the optical disk format. In the case of a CD (compact disk), for example, laser light of 780 nm (nanometers) wavelength is used. However, a DVD uses laser light of 650 nm wavelength. A so-called DVR capable of writing in a high density recording format utilizes laser light of 405 nm wavelength.

Using an optical pickup capable of emitting laser light at wavelengths suitable for all formats allows compatible use of all the above mentioned optical disk types by a single optical pickup.

Though installing two lenses and their respective laser emitters in a single pickup to actually use both DVR and DVD/CD was possible, an optical pickup of the prior art configured this way had the problem that the size was too large and adjustment was complicated.

Two types of optical disks are used. One type is a bare disk not utilizing a cartridge. The other type is an optical disk stored inside a cartridge. The bare disk must be placed on a turntable and clamped in place by a clamping means. Though differing depending on the format, cartridge type optical disks usually have a clamping means inside the cartridge and do not require a clamping means in the recording and reproduction apparatus itself. A disk recording and reproduction apparatus configured to use compatibly both cartridge type optical disks and bare disks therefore had the problem that a means was required to retract a clamping mechanism used especially when a cartridge type optical disk was inserted.

In view of the above-described problems, the present invention therefore has the object of providing a disk recording and reproduction apparatus capable of using multiple disk recording media that were impossible to be recorded or reproduced by a single pickup. A further object is to provide a disk recording and reproduction apparatus capable of retracting the clamping mechanism during loading of a cartridge type disk recording medium when a cartridge type disk recording medium or a bare disk type recording medium is selectively installed.

DISCLOSURE OF THE INVENTION

One aspect of the present invention resides in a disk recording and reproduction apparatus for performing recording and/or reproduction with a pickup while rotating a disk recording medium, wherein the disk recording and reproduction apparatus is comprised of a common rotating drive means for driving multiple types of disk recording media of different formats, and multiple pickups respectively installed for the multiple types of disk recording media of different formats.

Here, the multiple pickups each have a drive means and when one pickup is accessing the recording medium with the corresponding format, the other pickups may be retracted to the outer circumferential side of the recording medium. Also, multiple pickups may have their respective drive means, and when one pickup is accessing the recording medium with the corresponding format, the other pickups may be retracted to the outer side of the light projection area. The invention may also contain two types of pickups, and these two types of pickups may be installed approximately 180 degrees apart in a circumferential direction versus the center of rotation of the disk recording and reproduction apparatus. Pickups for formats susceptible to dust may be installed on the inner side of the case. The multiple pickups may also be capable of separate operating system alignment.

Another aspect of the present invention resides in a disk recording and reproduction apparatus for performing recording and/or reproduction with an optical pickup while rotating a disk recording medium, wherein said recording and reproduction apparatus comprises an installation means to selectively install a cartridge type disk recording medium and bare disk type recording medium, and a clamping means to clamp the bare disk type recording medium, and a drive means to move the clamping means to a non-operating position when the cartridge type disk recording means has been installed.

When a cartridge type disk recording means has been installed, the driving force of the installation means may be utilized to allow the cartridge to move the clamping means to a non-operating position. Also, when the cartridge has been ejected, the resilient recovery force of the elastic member may be utilized to return the clamping means to the operating position. The clamping means may contain a movable retractor, and at the final stroke of the installation means to eject the cartridge, the retractor may be pulled out of the clamping means. The installation means may contain an engaging means having a limiter function and the retractor is pulled from the clamping means by the engaging means.

In another preferred aspect of the present invention, a disk recording and reproduction apparatus capable of compatible use of two different formats for a DVR at a laser light wavelength of 405 nm and a DVD at a laser light wavelength of 650 nm uses two separate optical pickups installed corresponding to each of the above two formats. Furthermore, a single turntable for rotating all types of optical disks is installed and the above two optical pickups are installed facing each other at 180 degrees apart along the circumferential direction versus the turntable rotating the disk. The optical systems of each optical pickup are capable of separate alignment. Optical pickups having formats easily susceptible to dust may be installed toward the rear of the case to avoid errors caused by dust that otherwise might occur when inserting an optical disk into or ejecting it from this apparatus.

The above structure of the present intention will take up less space in view of structures for using optical disks of multiple formats by a single apparatus. Also, when two optical disk pickups are installed along with the turntable onto a mono-strength base chassis, no overall movement mechanism is required for moving these components so dimensions are highly stable once assembled and adjusted.

Another aspect of the present invention, along with having separate optical pickups for multiple types of optical disks of different formats, is provided with an apparatus to drive the multiple types of optical disks on a common turntable. In this aspect, while one optical pickup is in operation, at least the objective lens unit of the other optical pickup is moved to the outer circumferential side of the optical disk or more preferably to the outer side of the light projection area. This is because the position of the objective lens unit is more protrudent than the other optical pickup, namely it is in the nearest position for the optical disk.

An apparatus configured this way for using optical disks of mutually different formats prevents interference from occurring between the optical disk and multiple types of optical pickups and allows using a common turntable for driving various types of optical disks, so that less component space is required, fewer components are needed, and the assembly cost is lowered. Also by making one optical pickup retract to a position farther to the outer circumferential side than the position during recording and reproduction without having to add special components, the increase in parts cost can be held to virtually zero and the reliability maintained. By retracting the optical pickup toward the outer circumferential side along the radius, no space or mechanism is required in the thickness direction so that the base unit and device can be kept unchanged at their thin dimensions.

In another aspect of the present invention, the disk drive device compatible with both cartridge type optical disks and bare disk type optical disks uses a bare disk clamping mechanism capable of retracting when it is not needed because the cartridge type optical disk is in use. When a cartridge has been inserted, the tray loading drive force is utilized to apply contract pressure on the front surface of the disk cartridge to retract it to a specified position. During ejection of the cartridge, the disk clamping mechanism is restored to its original position by the elastic force of a resilient means, for example, a torsion coil spring. A hook on the rear edge of the tray catches the front side of the retractor, and by extending the retractor, makes it function as a limiter on the hook to restore the disk clamping mechanism to its original position during ejection of the cartridge and also eliminates effects of an irregular tray eject stroke.

The invention configured as described above is therefore capable of rendering a device able to compatibly use both cartridge type optical disks and bare type optical disks while limiting the axial dimensions of the turntable.

Installing a retractor eliminates the direct press-contact on the clamping device by the cartridge and also eliminates the possibility that the top and bottom clamping members might disintegrate during insertion of the cartridge. Installing the retractor also eliminates the direct pressing of the cartridge on the clamping ring, eliminates the clamping ring from biting into the clamping holder rail during insertion of the cartridge, and alleviates the load applied to the loading motor during tray loading. Installing the retractor also increases the amount of overlap on the cartridge so that operation errors can be prevented and the operation is made more reliable.

BEST MODE FOR CARRYING OUT THE INVENTION (1) Working Examples

Figure 1:
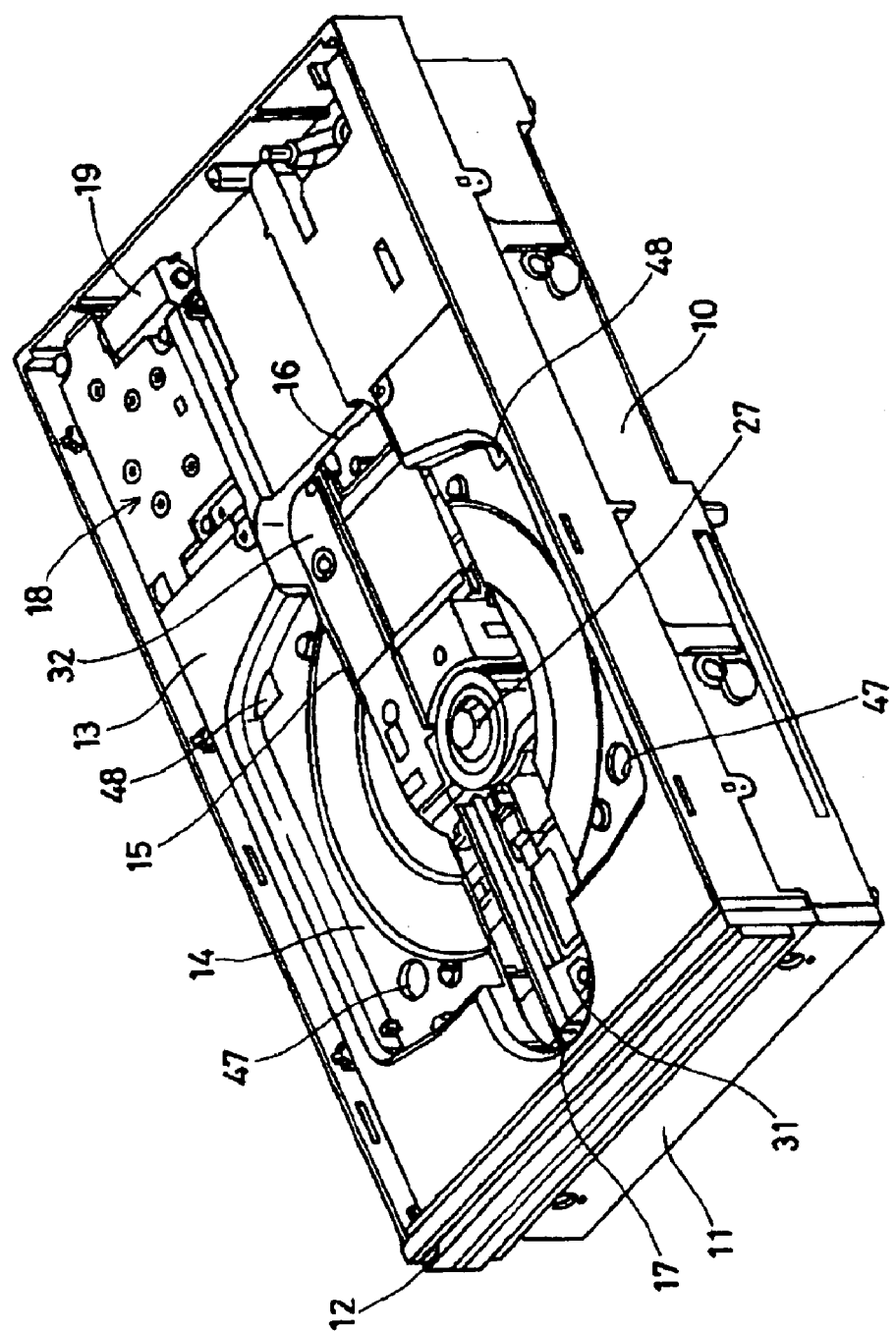
FIG. 1 is a perspective view of an essential section of the disk recording and reproduction apparatus.
Figure 2:
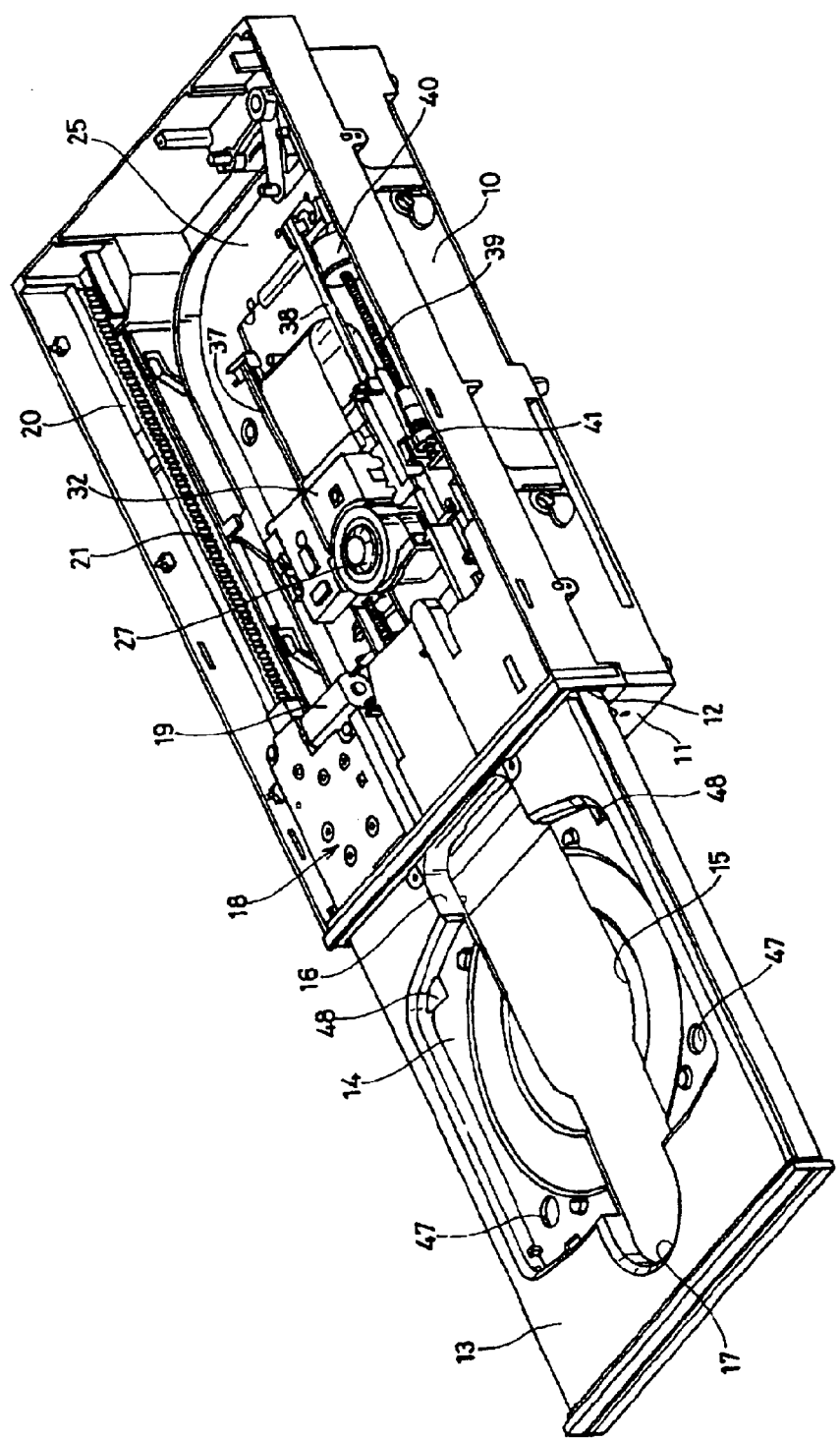
FIG. 2 is a perspective view showing the tray when pulled out.
Figure 3:
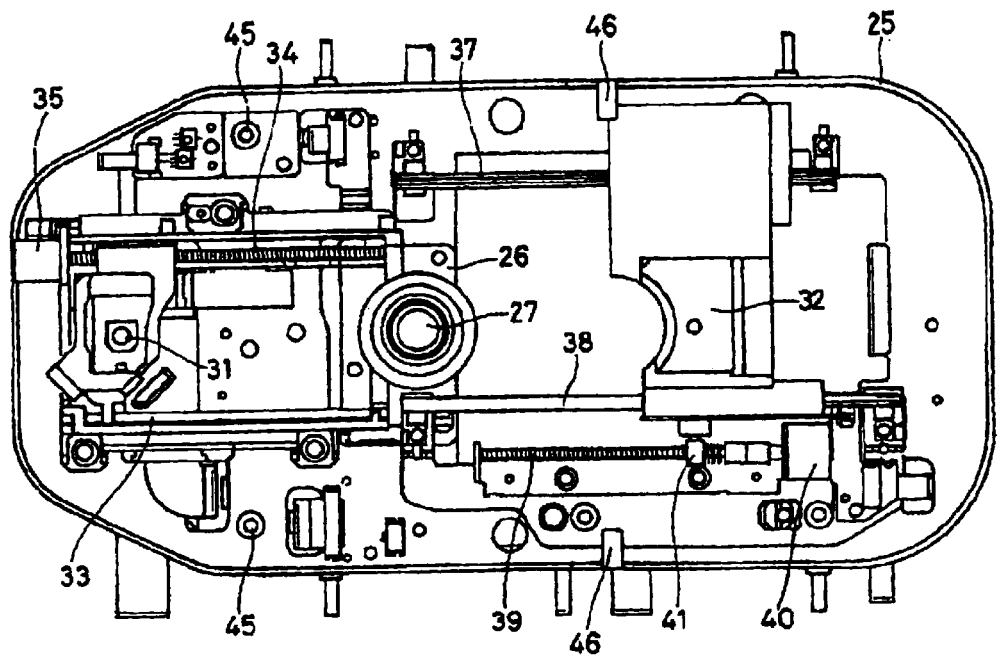
FIG. 3 is a top view of the base unit.
Figure 4:
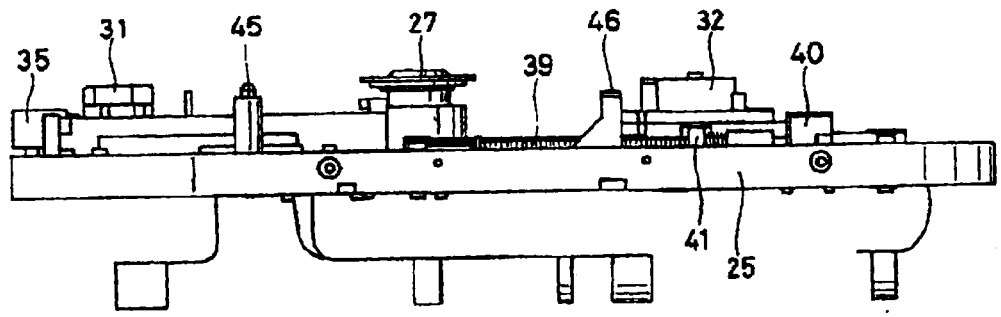
FIG. 4 is a side view of the base unit.
Figure 5:
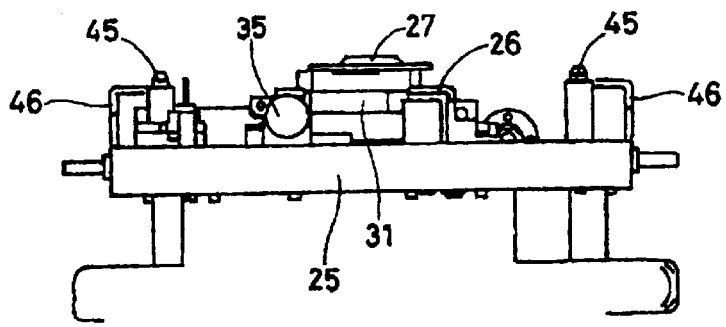
FIG. 5 is a front view of the base unit.
Figure 6:
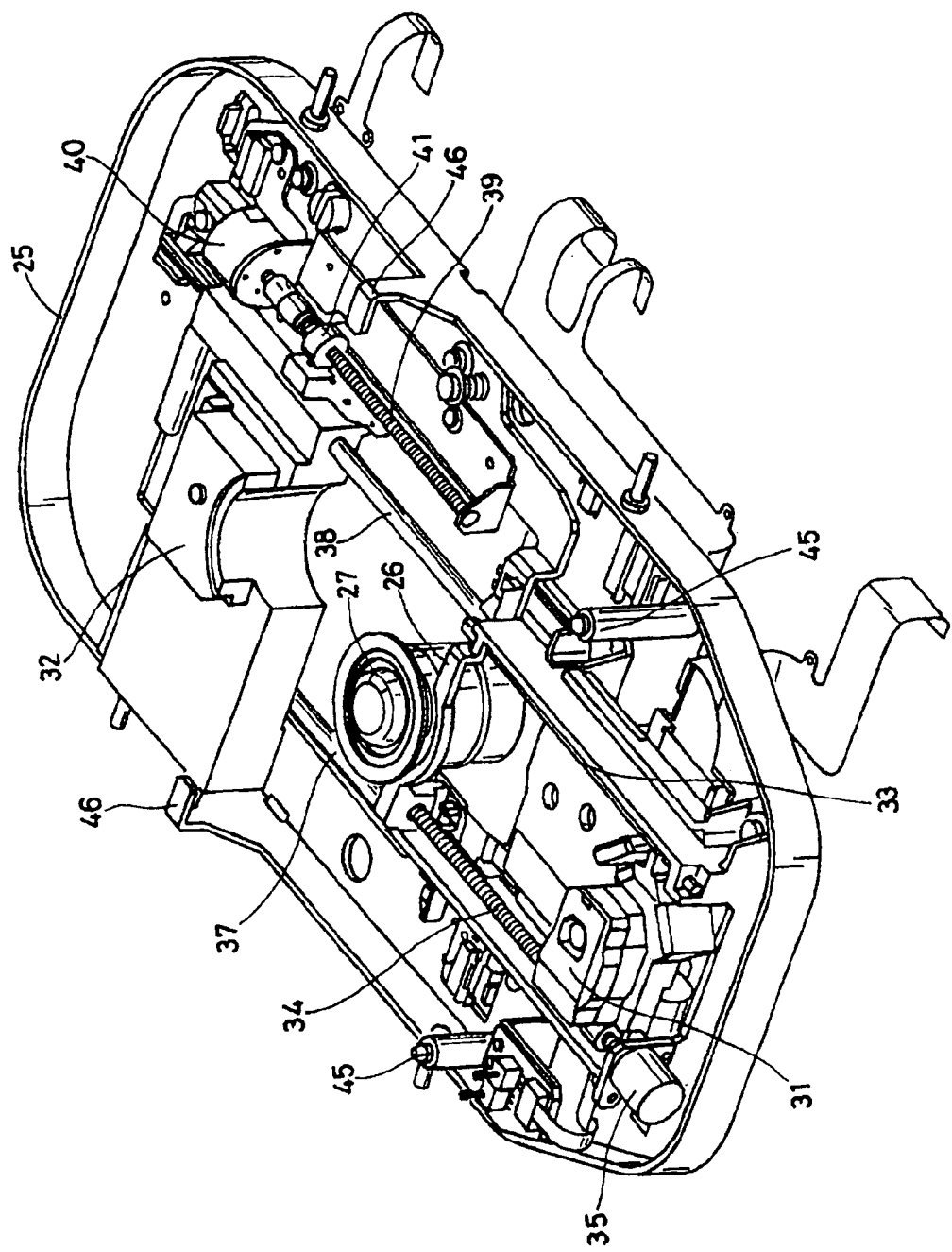
FIG. 6 is a perspective view of the base unit.

FIG. 1 and FIG. 2 are drawings showing the overall structure of the disk recording and reproduction apparatus of the first embodiment of the present invention. This apparatus has an outer case 10 made of a flat rectangular parallelepiped. The upper section is open here as shown in FIG. 1 and FIG. 2. A longitudinal slot 12 is formed in a front panel 11 for sealing the opening on the front side of this outer case 10. A tray 13 capable of being pulled out from this longitudinal slot 12 is assembled into the inside of the outer case 10.

The tray 13 has a concavity 14 formed in the middle section to receive the cartridge or the bare disk. The tray 13 is also formed with an opening 15 extending vertically so as to cross the concavity 14. The inner side of this opening 15 is formed with a U-shaped notch 16 and the nearer side is formed with a semicircular notch 17.

A drive unit 18 is formed on a side section of the inner side of the tray 13. A motor 19 is installed to drive the drive unit 18. The tray 13 is supported by a step 20 on both sides of the inner sides of the outer case 10. A pinion comprising the output end of the drive unit 18 engages with a rack 21 on the lower side of the step 20, so the longitudinal slot 12 can in this way be pulled out or stored freely as shown by FIG. 1 and FIG. 2.

A base unit 25 is installed on the upper section of the bottom plate of the outer case 10 as shown in FIG. 3 through FIG. 6. The base unit is made from a chassis of sheet metal. A turntable 27 is installed approximately in the center of that chassis supported by a bracket 26. The turntable 27 is directly driven by a motor below it.

A DVD pickup 31 is installed on the nearer side and a DVR pickup 32*a* is installed on the inner side of the turntable 27 in the base unit 25. This DVD pickup is supported on both sides by a guide rod 33 and a feed screw 34. The feed screw 34 is driven by a stepping motor 35 and the DVD pickup is in this way moved along the radius of the optical disk.

The DVR pickup 32 on the inner side, however, is guided by a pair of guide rods 37 and 38 provided on both sides. A feed screw 39 is installed for moving the DVR pickup 32 along the radius of the optical disk. This feed screw 39 is driven by a stepping motor 40 and engages with a nut 41 of the pickup 32.

A pair of support rods 45 are installed on both sides at the front on the base unit 25 and a support arm 46 is installed on both sides at the rear. When the base unit 25 are raised by an elevating mechanism not shown in the drawing, these support rods 45 and support arm 46 protrude from the openings 47 and 48, and the DVR cartridge 51 on the tray 13 is supported by the four corners of the tray from the bottom.

Figure 13:
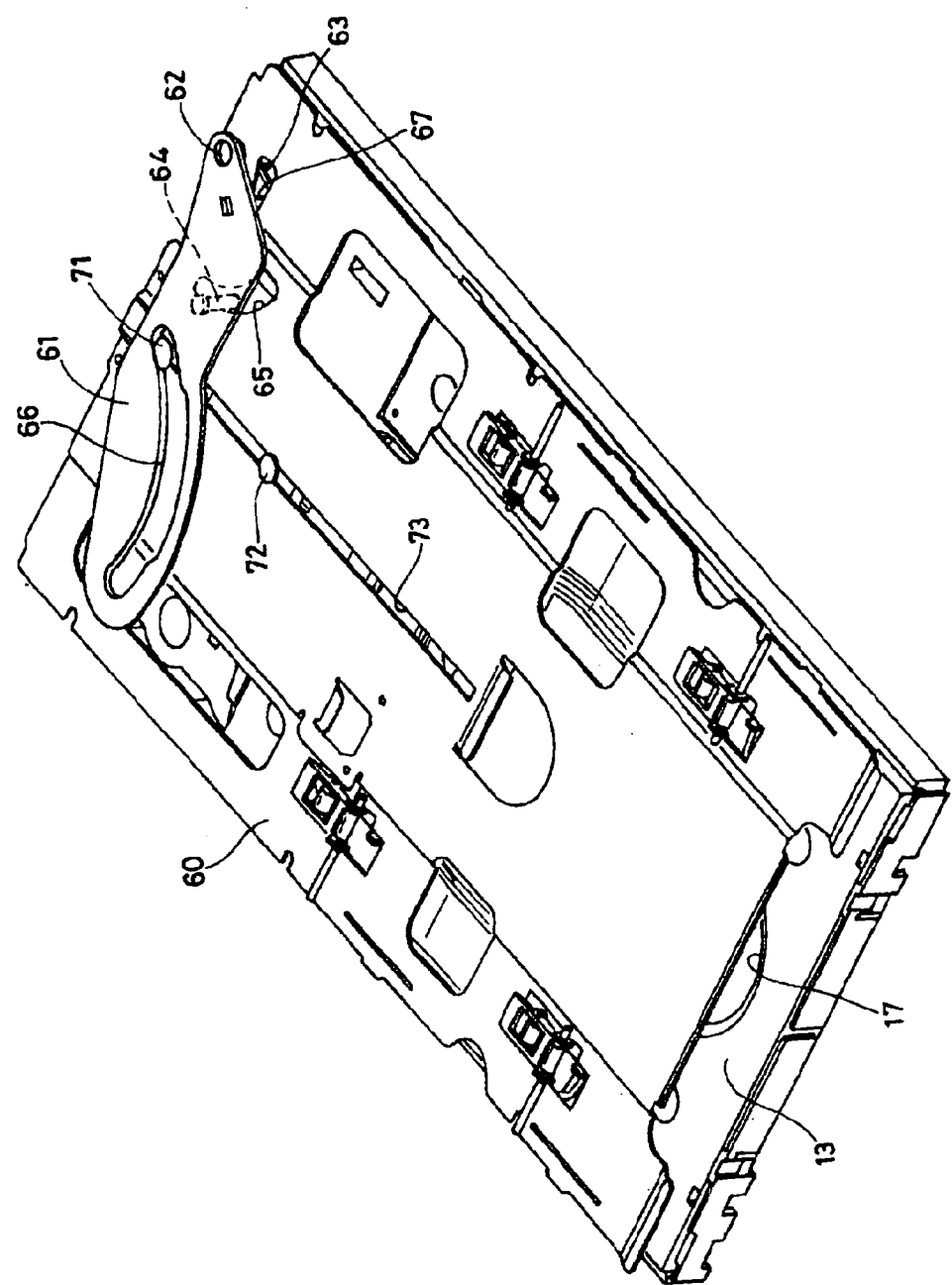
FIG. 13 is a perspective view of an essential section of the retractable clamping mechanism.
Figure 14:
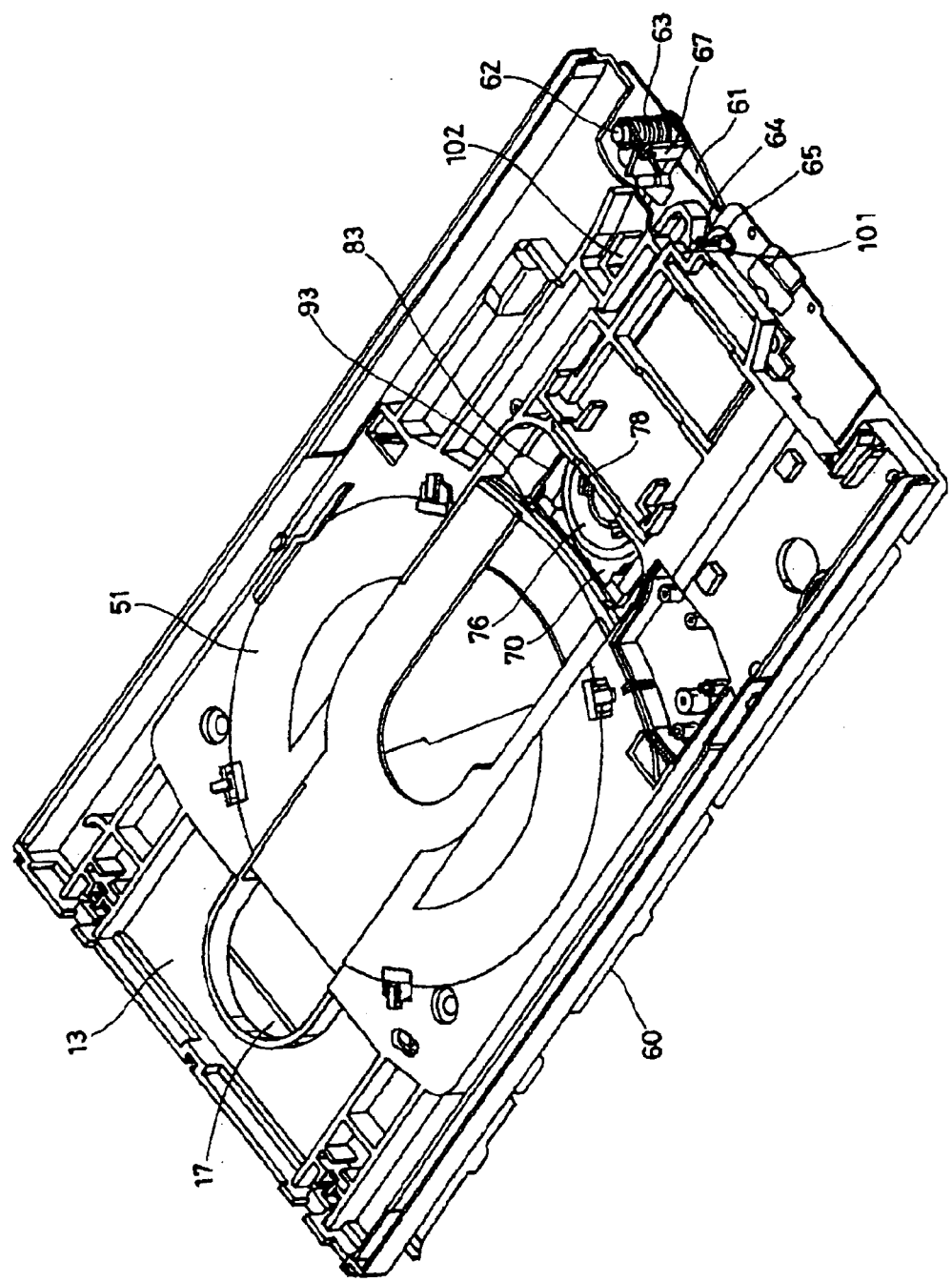
FIG. 14 is a perspective view of an essential section showing the reverse status.
Figure 15:
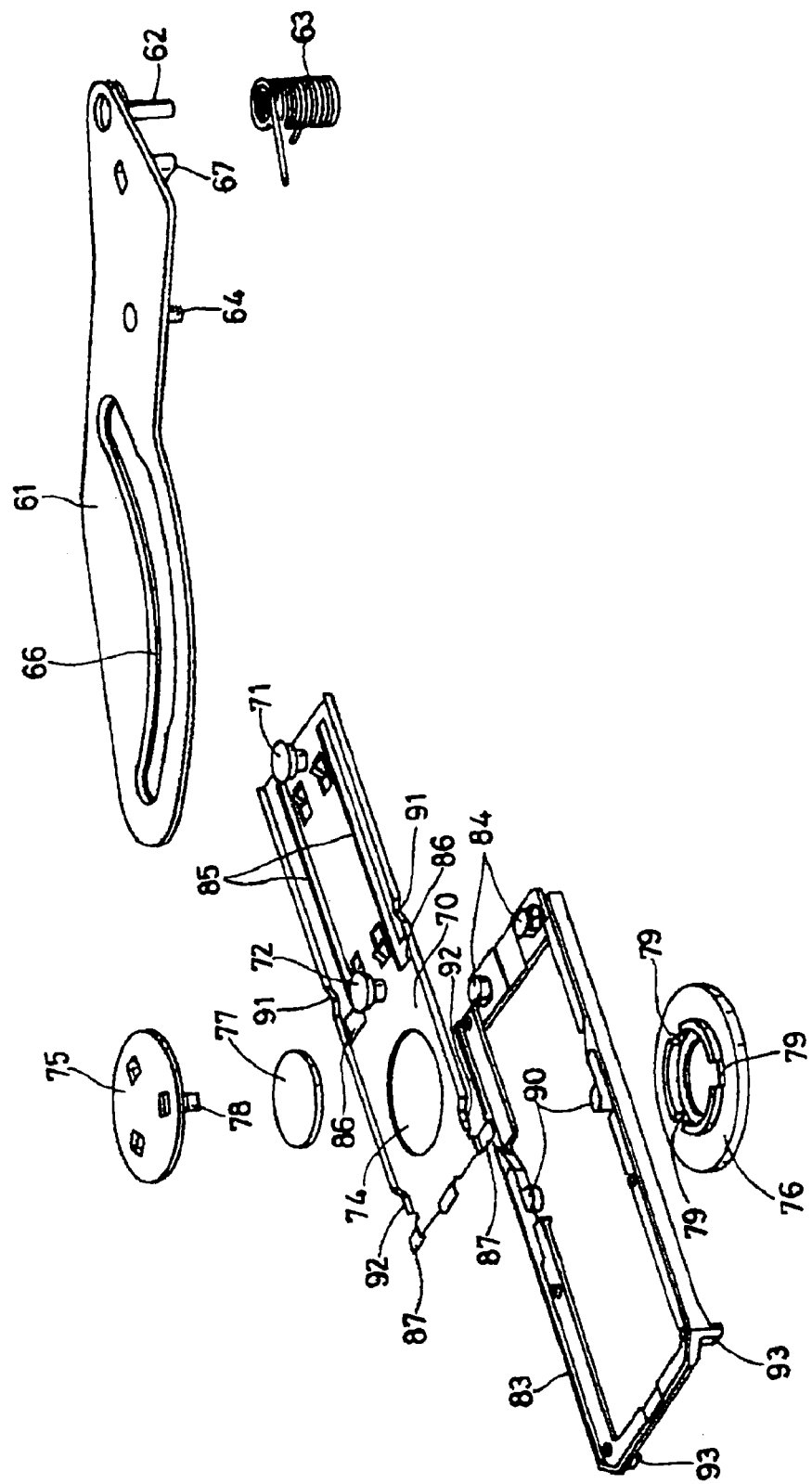
FIG. 15 is an exploded perspective view of the retractable clamping mechanism.
Figure 16:
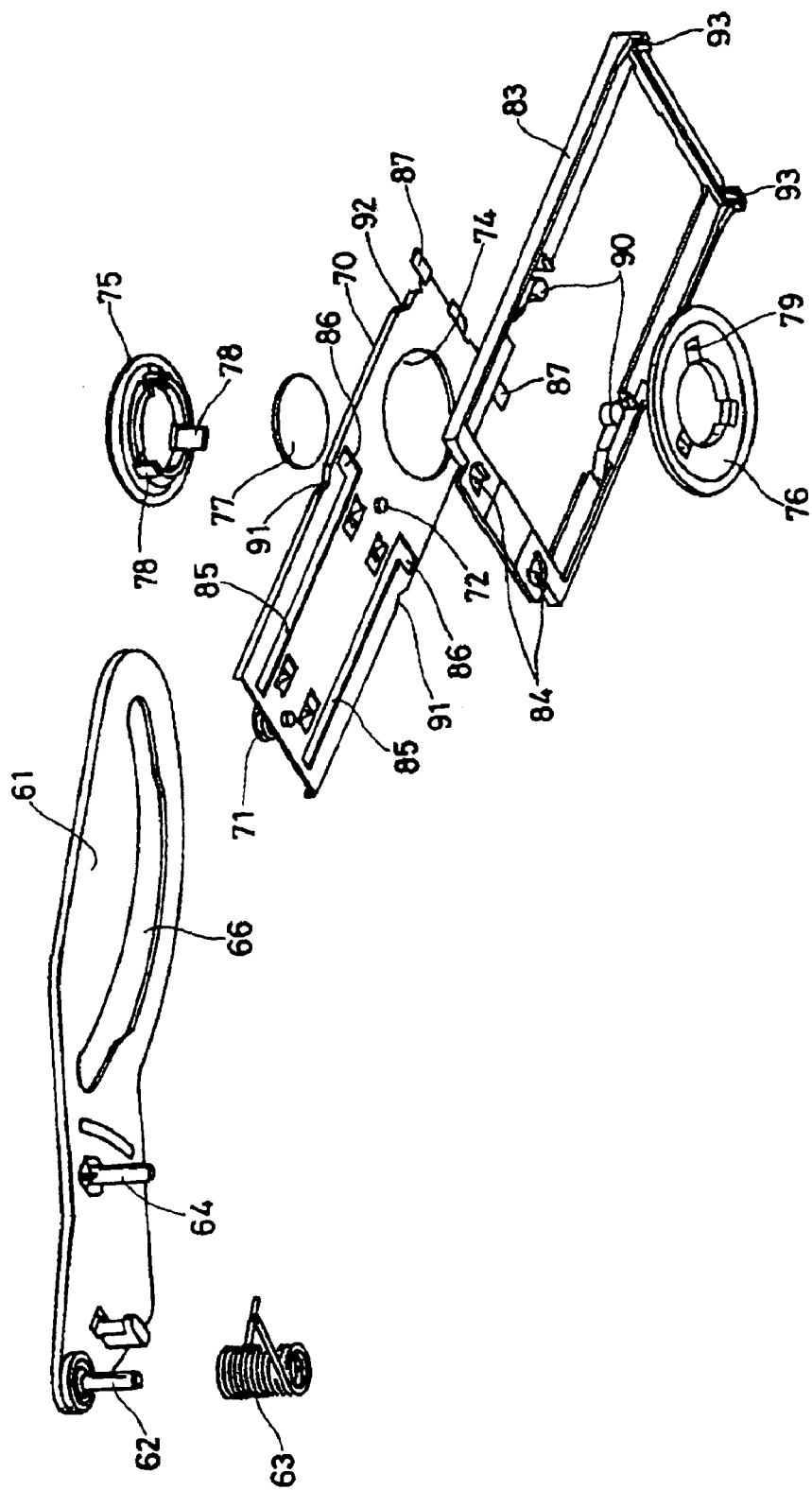
FIG. 16 is a perspective view of the retractable clamping mechanism as seen from below.

Next, the clamping device for driving the bare disk 52 and the turntable 27 on the base unit 25 as well as the structure of the mechanism to retract the clamping device are described. A holder plate 60 is installed to shut the opening on the upper section of the outer case 10 as shown in FIG. 13 and FIG. 14. A drive arm 61 that rotates centered around a pin 62 is installed on the holder plate 60 as shown in FIG. 13. A torsion coil spring 63 is installed on the outer circumference of the pin 62 for the drive arm 61 as shown in FIG. 15 and FIG. 16. The arm of this torsion coil spring 63 makes press-contact with the protrusion piece 67 installed on the drive arm 61.

A pin 64 is installed so as to protrude into the bottom surface of the drive arm 61. This pin 64 is held by an arc-shaped opening 65 formed in the holder plate 60 (See FIG. 13) The leading edge section of the drive arm 61 contains an arc-shaped opening 66 with a comparatively large curve radius.

A holder 70 for the clamping device can be installed on the lower side of the holder plate 60. A pair of pins 71 and 72 with flanges are installed on the holder 70 as shown in FIG. 15. These pins 71 and 72 engage with the line-shaped slit 73 of the holder plate 60. In particular, the pin 71 further engages with the arc-shaped opening 66 of the drive arm 61. Therefore, when the drive arm 61 is driven to rotate, the holder 70 is linearly moved along the line-shaped slit 73 of the holder plate 60.

A circular opening 74 is formed in the holder 70 and the upper and lower clamp rings 75 and 76 are installed so as to sandwich the clamp plate 77 by way of this circular opening 74. The upper clamp ring 75 has three hooks 78 formed along the circumferential direction at 120 degree intervals to protrude downward. These hooks 78 are inserted into engaging holes 79 installed at 120 degree intervals along the circumferential direction of the clamp ring 76 and fastened. The pair of clamp rings 75 and 76 and the clamp plate 77 installed on the holder 70 comprise the clamping mechanism and clamp the bare disk 52 from above.

A retractor 83 is also installed on the holder 70. The retractor 83 is a frame made from plastic. The rear edge has a pair of posts 84 with flanges. The posts 84 engage within the slits 85 on both sides of the holder 70 so as to slide along the slits. The flange section of the posts 84 are inserted into the slits 85 by way of an enlarged section 86 on the front end of the slit 85. The lower surface of the front edge side of the retractor 83 engages with the stop pieces 87 formed to protrude on both sides to the front end of the holder 70 (See FIG. 20 and FIG. 21). This kind of structure allows the retractor 83 to be coupled to the holder 70 to allow movement along its length.

The retractor 83 is made from a molded plastic piece and contains two elastic pieces 90 at an intermediate position on both sides along its length. The elastic pieces 90 engage with the engaging concavity 91 formed on both sides at an intermediate position of the holder 70 or engage with the engaging concavity 92 formed on both sides at the leading edge side of the holder 70. The retractor 83 has a pair of hooks 93 that protrude downward in the front edge side. The hooks 93 are pressed on by the walls of the front end side of the DVR cartridge 51 and the retraction operation is performed in this way.

(2) Explanation of Operation

The operation of the above recording and reproduction apparatus is described next. When the tray 13 is pulled into the outer case 10 while loaded with a DVR cartridge 51 in the concavity 14 of the tray 13 as shown in FIG. 2, the DVR cartridge 51 is loaded into the apparatus as shown in FIG. 1 through FIG. 9. The DVD pickup 31 is then retracted at this time by the stepping motor 35 and the feed screw 34 to the outer circumferential side which is a section on the forward side of the tray 13. The DVR cartridge 51 is supported at this time respectively by the pair of support rods 45 and the pair of support arms 46 of the base unit 25. These rods 45 and arms 46 are all brought up through the openings 47 and 48 of tray 13 to the concavity 14 of tray 13 by the elevating operation of the base unit 25, and the DVR cartridge 51 is correctly positioned.

Figure 10:
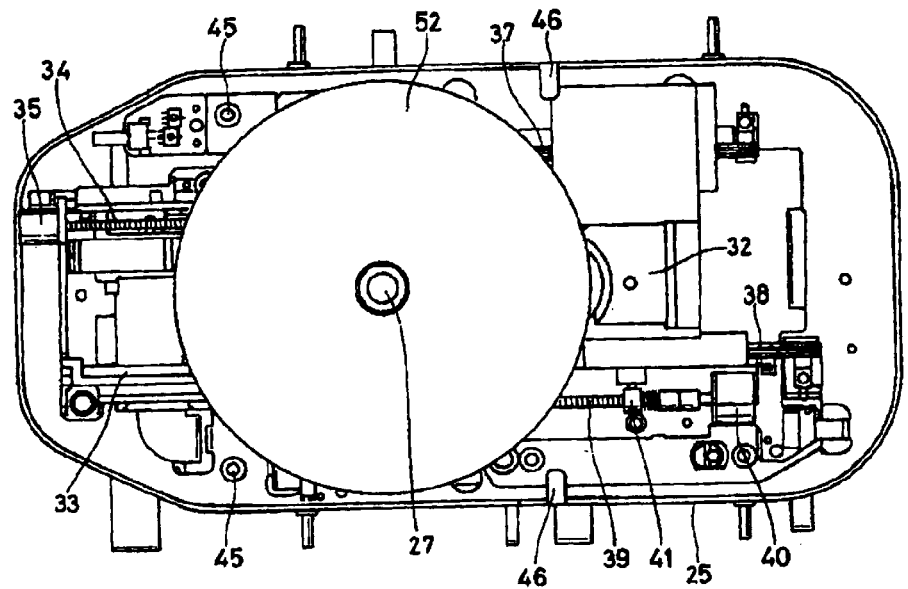
FIG. 10 is a top view of the base unit loaded with the bare disk.
Figure 11:
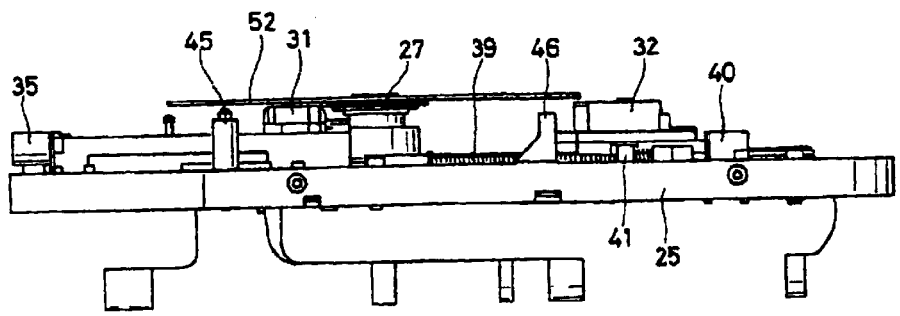
FIG. 11 is a side view of the same section.
Figure 12:
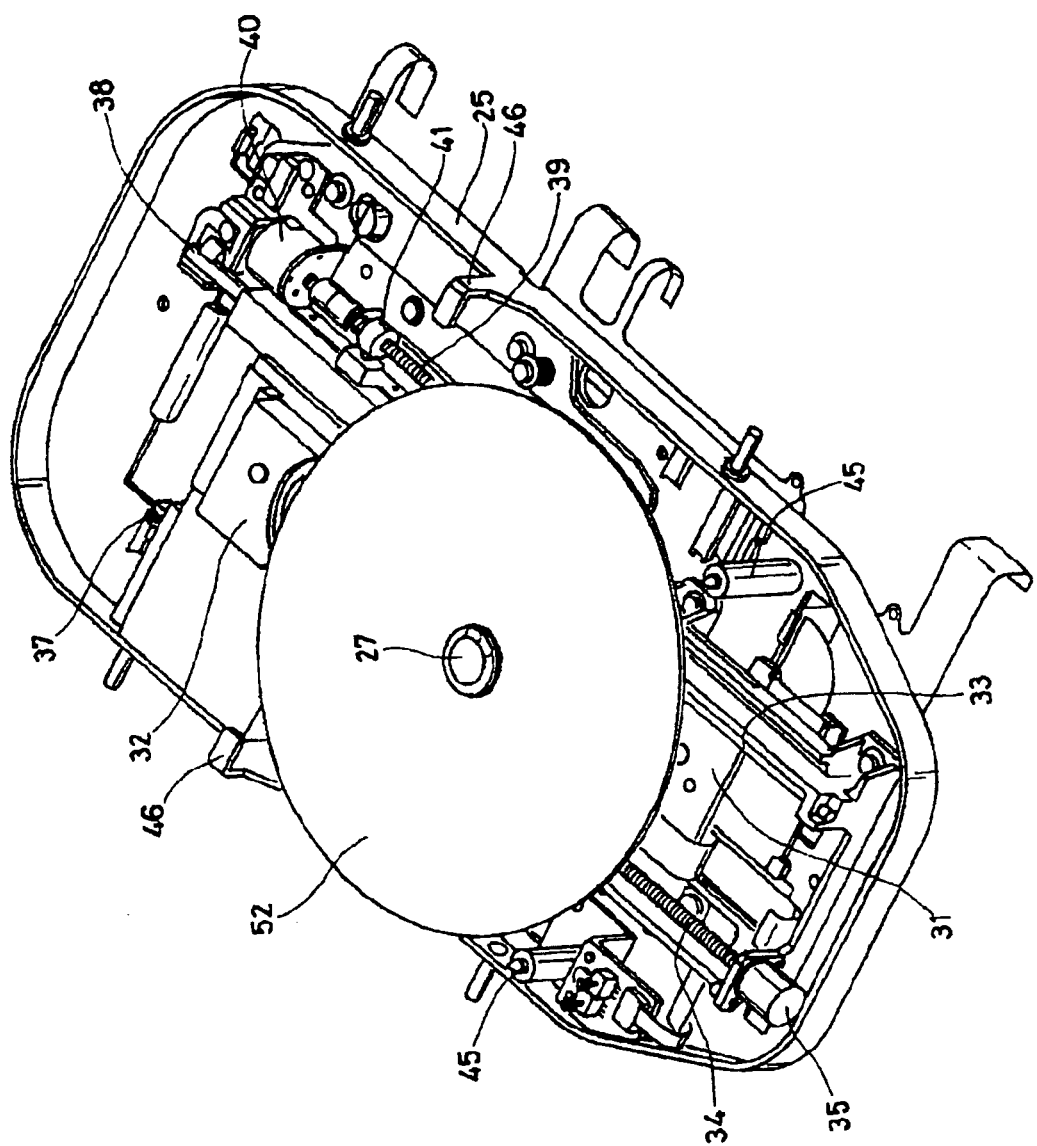
FIG. 12 is a perspective view of the same section.

In contrast, when the tray 13 is pulled into the device while the bare disk 52 is loaded on the concavity 14 of tray 13, the tray 13 is pulled into the outer case 10. The positional relation of the bare disk 52 on the base unit 25 at this time is shown in FIG. 10 through FIG. 12. In this case, the feed screw 39 retracts the DVR pickup 32 to a section on the inner side of tray 13 by utilizing the stepping motor 40, and the DVR pickup 32 is positioned on the outer circumferential side of the bare disk 52. In other words, the above scheme is contrived to retract the DVR pickup 32 so that at least the lens section cannot enter the inner side of the light projection area of base unit 25 holding the bare disk 52. The DVD pickup 31 is positioned on the lower side of the bare disk 52 by way of the feed screw 34 by the stepping motor 35. The bare disk 52 is rotated in this state by the turntable 27, and recording and reproduction of the bare disk 52 performed.

In this way, the recording and reproduction apparatus of the present embodiment is capable of using disk recording media consisting of two mutually incompatible disk formats, namely DVD/CD and DVR. The base unit 25 is made of sheet metal or plastic and installed within the outer case 10 of this apparatus. The DVD/CD optical pickup 31 may be installed on the nearer side or the forward side in the base unit 25, and the DVR optical pickup 32 may be installed on the inner side. In contrast, the optical disk motor and the turntable 27 are utilized as one common unit, and the two types of optical pickups 31 and 32 at positions 180 degrees apart in the circumferential direction of the turntable 27 are respectively movable along the radius of the optical disk. The tilt and positions of each of the two types of optical pickups 31 and 32 can be adjusted.

When dust might possibly penetrate into the apparatus, the DRV pickup 32, which is an optical pickup for a high density recording format susceptible to dust, may be installed to the rear of the base unit 25 so its position is on the inner side of the outer case 10 as a dust countermeasure. The main spindle or sub-spindle of any of the guides 33, 37 and 38 for moving the two types of optical pickups 31 and 32 have been consolidated into at least one spindle in order to reduce the number of parts.

To prevent the DVR pickup 32 from striking the bare disk 52 when utilizing a bare disk 52 comprised of a DVD/CD, guide rods 37 and 38 are installed in this apparatus to move the DVR optical pickup 32 in a level position to the opposite side of the turntable 27. These guide rods 37, 38 are parts necessary for moving the DVR optical pickup 32 in the radius direction of the optical disk inside the cartridge when the DVR optical pickup 32 accesses the DVR cartridge 51. However, by making these guide rods 37 and 38 slightly longer, a mechanism for retracting the DVR optical pickup 32 can be obtained.

Conversely, to prevent the DVD/CD pickup 31 from striking the DVR cartridge 51 when using the DVR cartridge 51, the length of the guide rod 33 and the feed screw 34 are increased to move the DVD/CD pickup 31 to the outer circumferential side of the turntable 27 on the opposite side. The guide rod 33 and the feed screw 34 are parts required when the DVD/CD pickup 31 is accessing the bare disk 52. However, making these guide rods 33 and 34 slightly longer allows the DVD pickup to be retracted.

In the above embodiment, a pair of optical pickups 31 and 32 were installed at the nearer side and inner side of the base unit 25 at positions 180 degrees apart from each other along the circumferential direction of the turntable 27. However, the two types of optical pickups 31 and 32 need not always have this 180-degree positional relationship. For example, the two optical pickups 31 and 32 maybe installed in directions at right angle to each other so as to be movable, or they may be set at any desired angles, for example, at intersecting angles of 60 degrees in their direction of movement. The positions for directional movement of these two types of optical pickups 31 and 32 can be selected according to the relation with other components inside the outer case 10 or the base unit 25.

Figure 7:
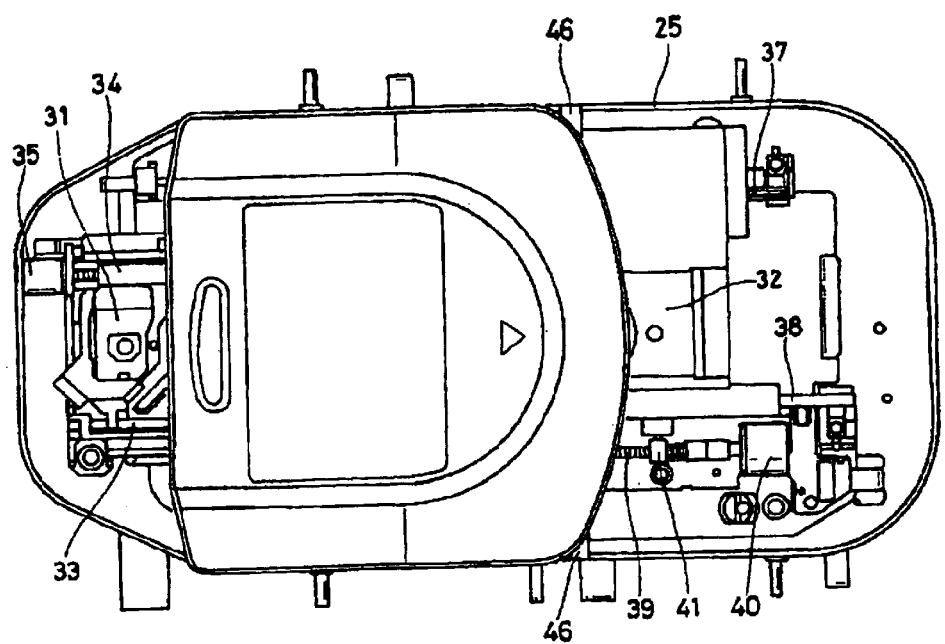
FIG. 7 is a top view of the base unit loaded with DVR cartridge.
Figure 8:
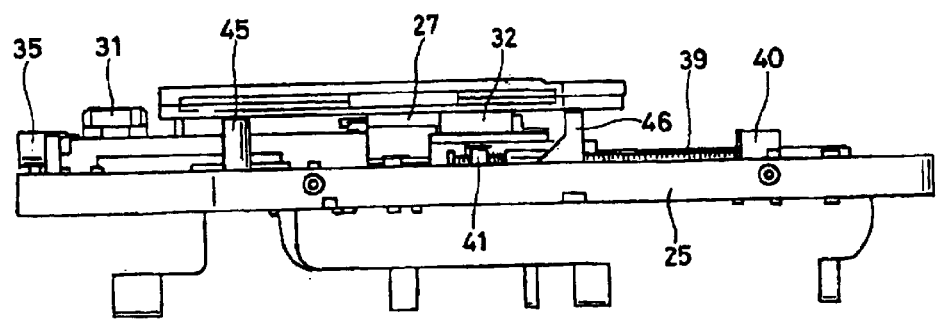
FIG. 8 is a side view of the same section.
Figure 9:
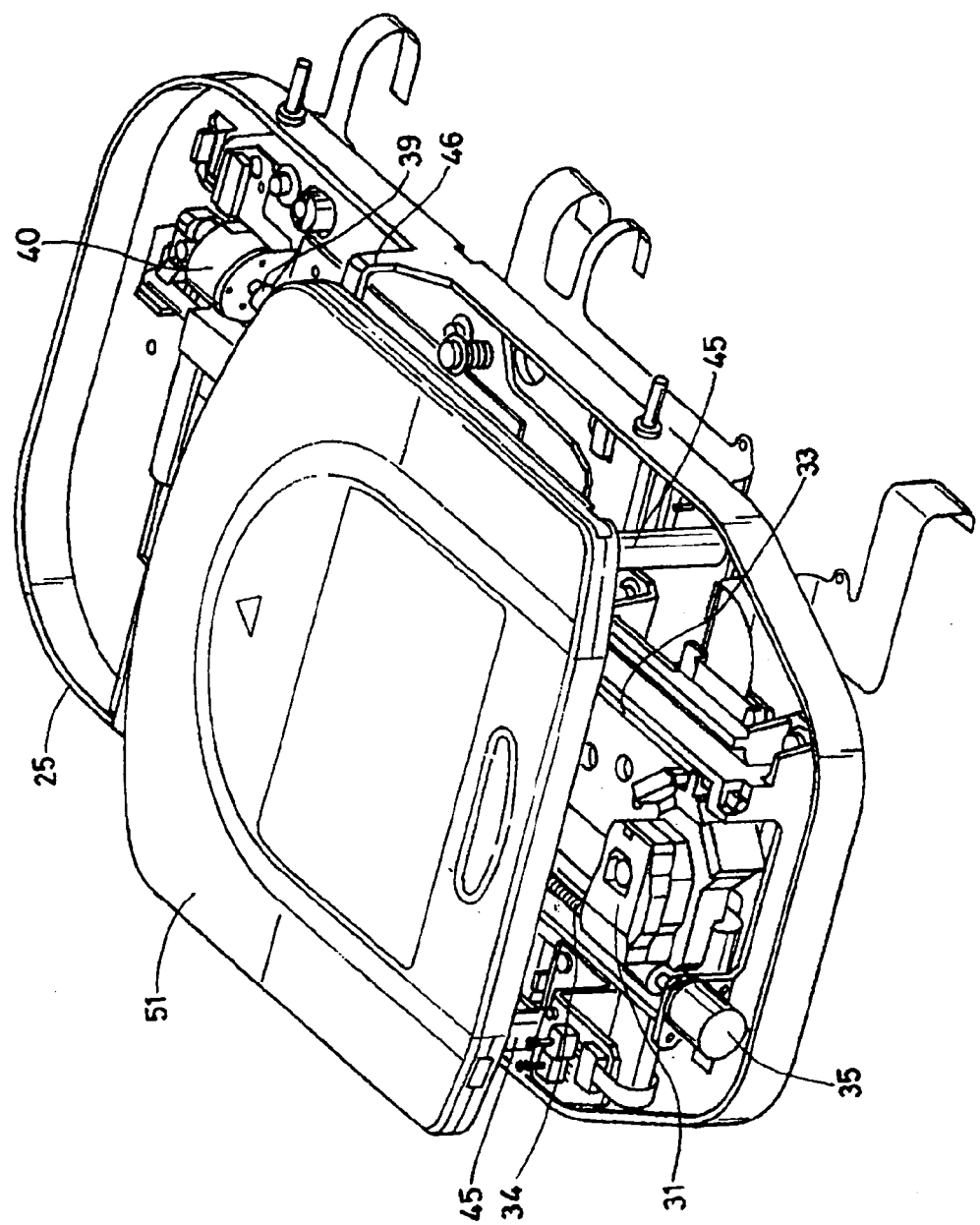
FIG. 9 is a perspective view of the same section.

In this kind of apparatus, when the bare disk 52 has been loaded as shown in FIG. 10 through FIG. 12, this bare disk 52 is clamped and rotated by the turntable 27 and the clamping mechanism. However, when a DVR cartridge 51 has been loaded as shown in FIG. 7 through FIG. 9, the disk inside the cartridge 51 is rotated by the turntable 27 so there is no need to clamp it with a clamping mechanism. To the contrary, the DVR cartridge 51 has specified dimensions along the optical disk axis, so that the clamping mechanism must be retracted when the DVR cartridge 51 has been loaded. The operation for retracting this clamping mechanism is described next.

Figure 17:
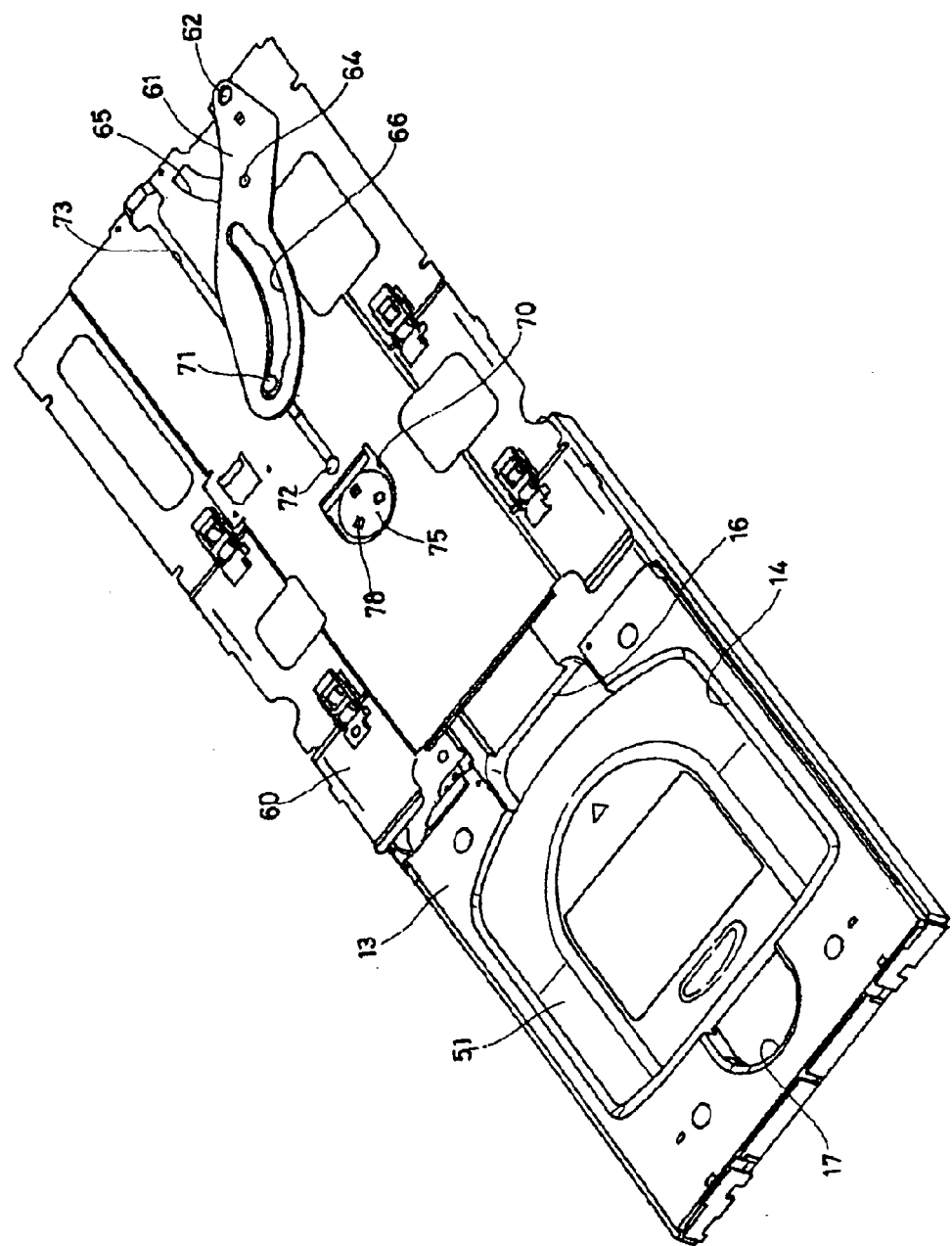
FIG. 17 is a perspective view of the retractable clamping mechanism with the tray pulled out.

A torsion coil spring 63 wound on a support pin 62 of the drive arm 61 applies a force in the counterclockwise direction centering on the pin 62 of the drive arm 61 in FIG. 17. So while the tray 13 is pulled out, the holder 70 engages with the arc-shaped opening 66 of the drive arm 61 by way of the pin 71, and the other pin 72 is in direct contact with the end edge of the line-shaped slit 73 of the holder plate 60. In other words, the holder 70 is pressed outward to the forward-most position.

At this time, the retractor 83 capable of movement while combined with the holder 70 has elastic pieces 90 engaging with the concavity 92 of the front end of the holder plate 60. This occurs because the when the tray 13 is pulled out as shown in FIG. 17 and FIG. 18, the engaging piece 98 (See FIG. 22) installed at the rear end of tray 13 catches on the hook 93 of retractor 83 and is pulled to the forward side with the movement of the tray 13.

Figure 18:
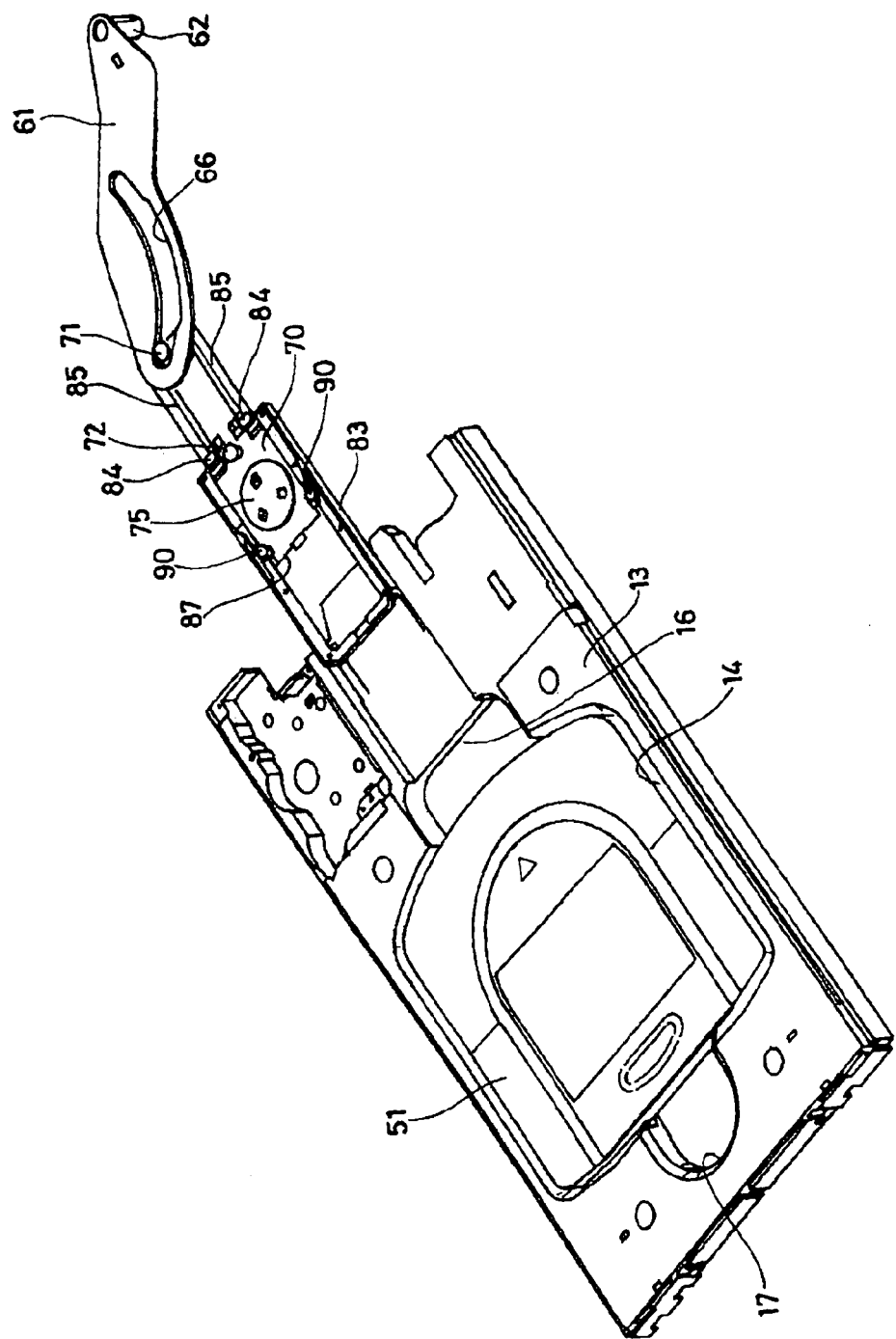
FIG. 18 is a perspective view showing the state of the same section with the holder plate removed.
Figure 19:
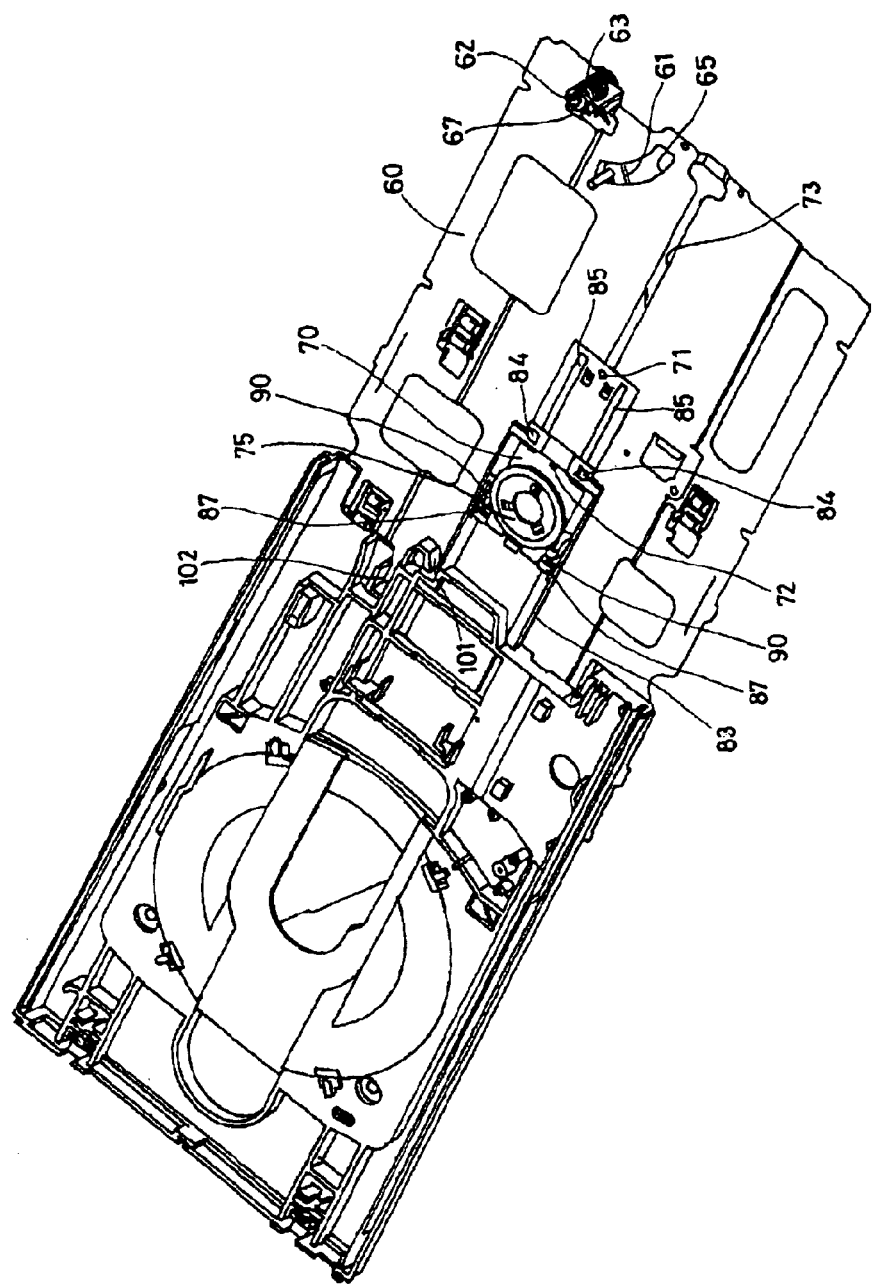
FIG. 19 is a perspective view showing the retractable clamping mechanism with the tray pulled out as seen from the bottom.
Figure 24:
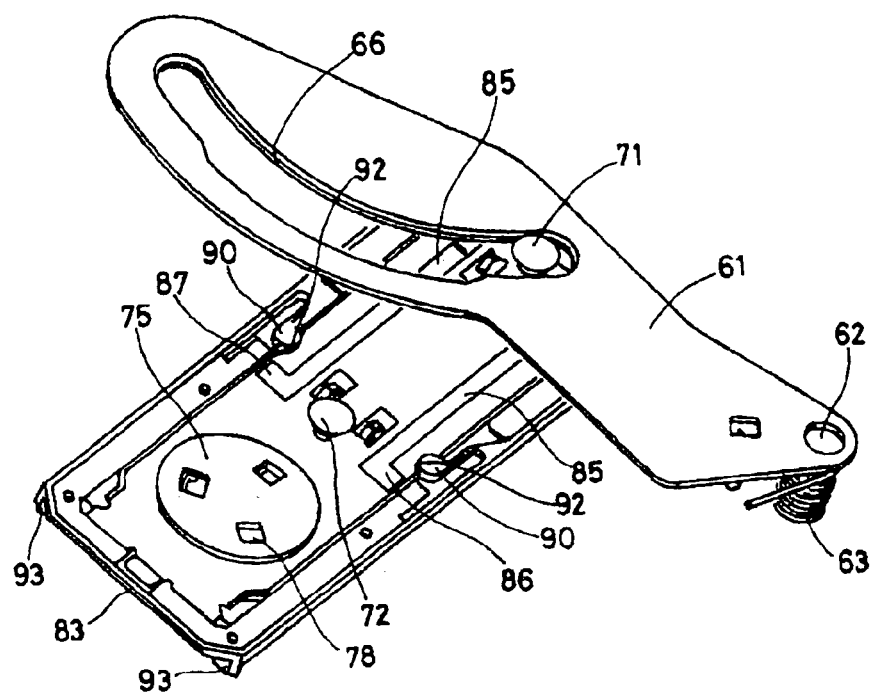
FIG. 24 is an enlarged perspective view of an essential portion of the same section.
Figure 25:
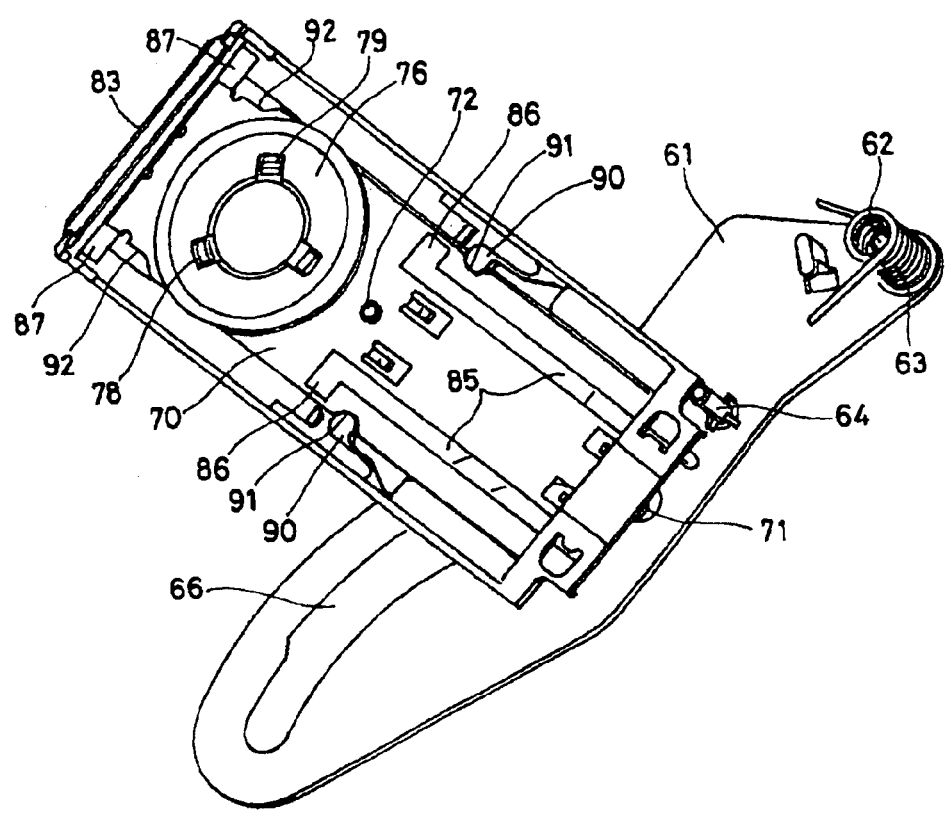
FIG. 25 is an enlarged perspective view of an essential portion of the same section as seen from below.

When the tray 13 is pulled inward into the inside of the outer case 10 as shown in FIG. 13 and FIG. 14 while the DVR cartridge 51 is loaded into the concavity 14 of tray 13 as shown in FIG. 17 and FIG. 18, the cartridge 51 on the tray 13 enters the lower side in the holder plate 60. In particular at this time, the wall section on the forward side of the cartridge 51 presses the hook 93 of retractor 83 as shown in FIG. 14. The retractor 83 is in this way first pressed rearward and moves rearward relative to the holder 70. The pull-out mechanism for the clamping mechanism in this way changes from the state shown in FIG. 20 and FIG. 21 to the state shown in FIG. 24 and FIG. 25.

More specifically, the position of the elastic piece 90 of retractor 83 changes from a position that engages with the engaging concavity 92 of holder 70 to a position engaging with the concavity 91. The retractor 83 then retracts along with the holder 70. The drive arm 61 linked to this holder 70 by way of the pin 71 is pressed back rearward while opposing the force of the torsion coil spring 63. At this time, elastic energy is accumulated in the torsion coil spring 63. When the drive arm 61 is then pressed back to approximately the maximum angle, in this state the pin 64 of the drive arm 61 is pressed into a shallow concavity 101 (See FIG. 14) formed on the rear end side of tray 13. The hook 93 of the retractor 83 is in this way separated slightly from the wall surface of the leading edge of the DVR cartridge 51 (side where it is inserted). The operation for retracting the clamping mechanism is shown in FIG. 26A through FIG. 26C.

Figure 20:
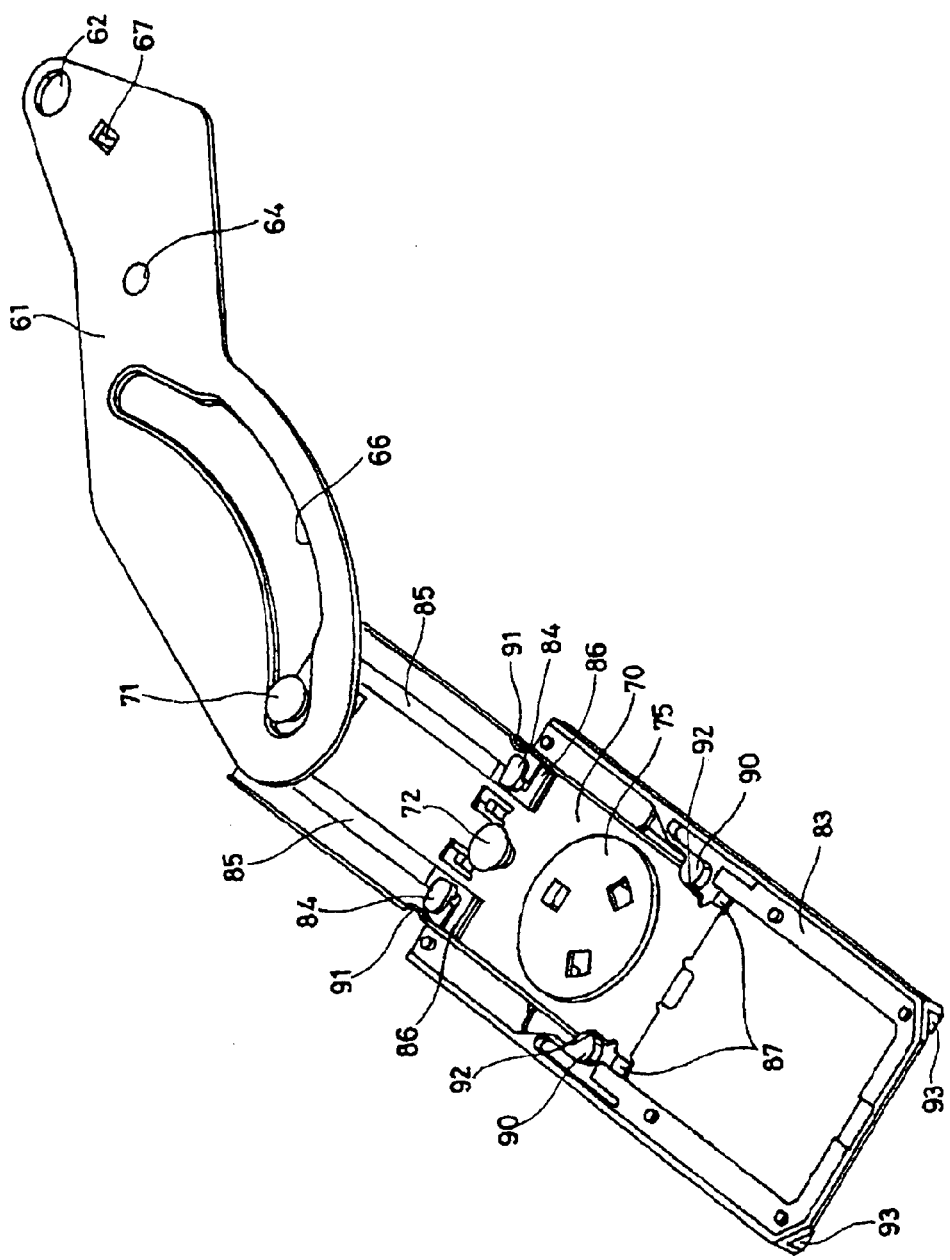
FIG. 20 is an enlarged perspective view of an essential section of the retractable clamping mechanism when tray pulled out.
Figure 21:
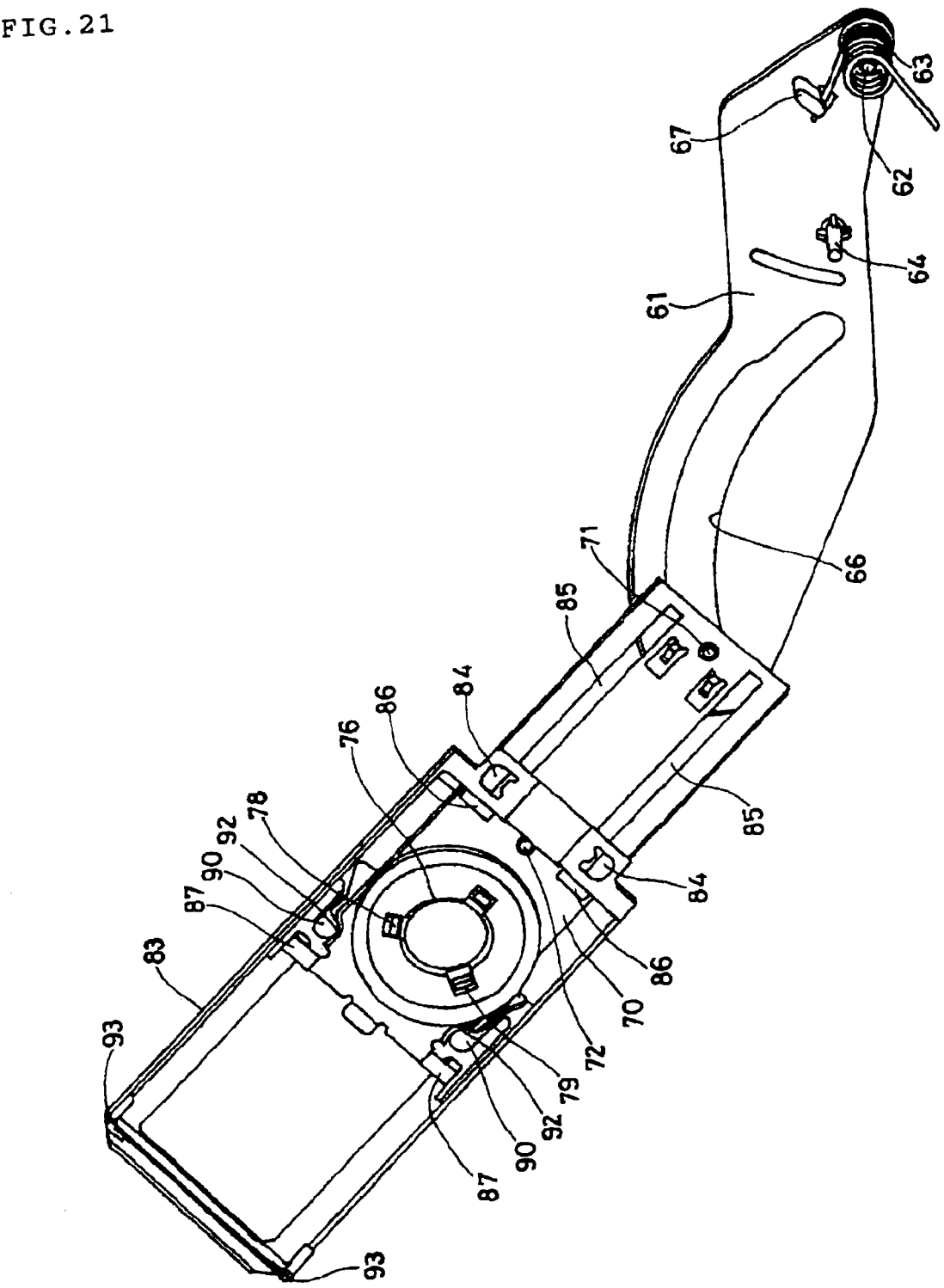
FIG. 21 is an enlarged perspective view of an essential section as seen from below.
Figure 26A:
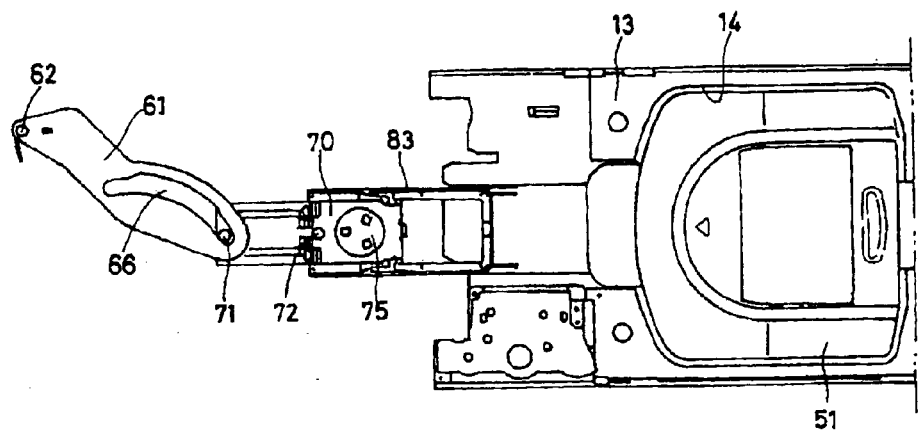
FIGS. 26 through 26C are top views showing the operation for retracting the retractable clamping mechanism when loading the cartridge.
Figure 26B:
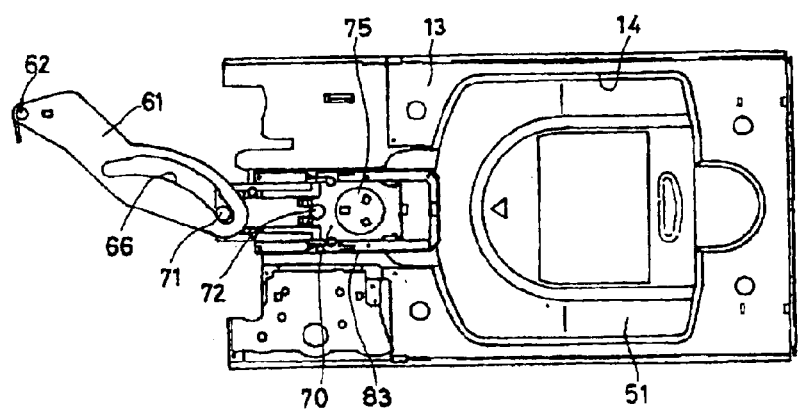
Figure 26C:
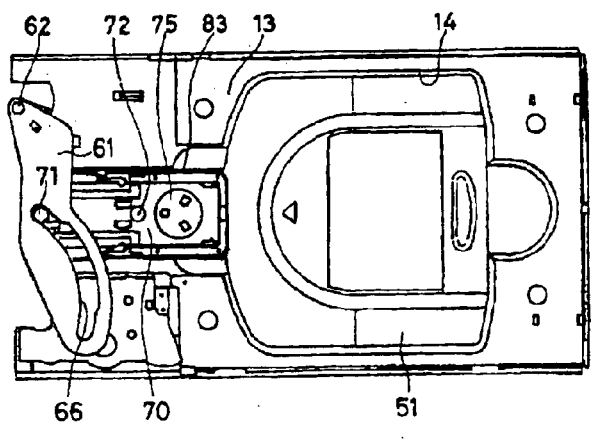
Figure 27A:
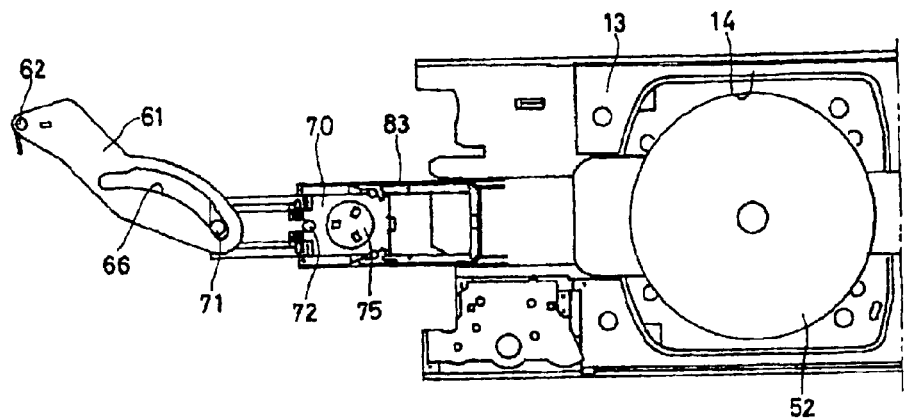
FIGS. 27 through 27C are top views showing the operation for retracting the retractable clamping mechanism when loading the bare disk.
Figure 27B:
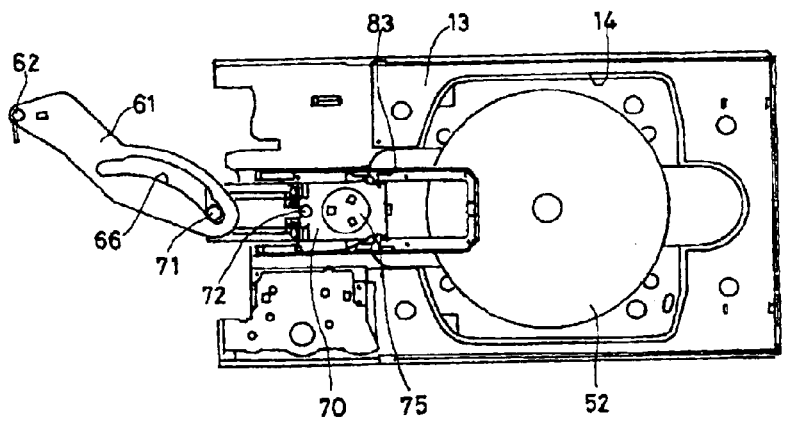
Figure 27C:
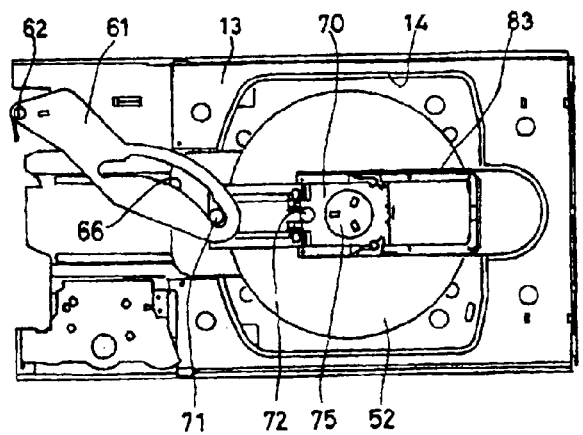

However, when a bare disk 51 has been loaded on the tray 13 and this tray 13 then pulled inward as shown in FIG. 27A through FIG. 27C, the retractor 83 is not pressed because the bare disk 51 has no cartridge. The arm 61 is therefore in a state moving to press out the clamping mechanism as shown in FIG. 20 and FIG. 21. When the tray 13 is pressed on in this state as shown in FIGS. 26A through 26C, the pin 64 of the drive arm 61 is received into the deep concavity 102 for the tray 13 shown in FIG. 14. The pin 64 of the drive arm 61 is therefore not pressed by the shallow concavity 101 of tray 13.

In the recording and reproduction apparatus of the present embodiment, when the retractable disk clamping mechanism in this way is inserted with the DVR cartridge 51, in the process for pulling in the tray 13 as shown in FIGS. 26A through 26C, first of all the leading edge of the hook 93 of retractor 83 grabs the front edge of the cartridge 51, releasing the position holding elastic piece 90 of retractor 83. The retractor 83 then gradually retracts to the position of the holder 70 as the tray 13 is pulled inward and the clamping holder 70 and retractor 83 are together pushed farther rearward by the driving force of the tray 13.

A torsion coil spring 63 is installed in the drive arm 61. When the tray 13 is ejected, the torsion coil spring 63 functions to press the disk clamping mechanism back. At this point, when the force accumulated in this torsion coil spring 63 is applied to the cartridge 51 after cartridge loading, the positioning of the cartridge 51 is adversely affected. To avoid this, as shown in FIG. 14, a shallow concavity 101 installed in the innermost part of tray 13 presses on the pin 64 installed on the lower edge of the drive arm 61 immediately prior to loading of the tray 13, so that the cartridge 51 is freed from the retractable disk clamping mechanism during clamping of the disk.

As shown in FIGS. 27A through 27C, when the bare disk 52 is loaded on the tray 13, the disk clamping mechanism is held at the specified position by the torsion coil spring 63 of the drive arm 61. The retractor 83 is extended during pull out of the tray 13 and that specified position is maintained with the elastic piece 90 engaged in the concavity 92 of holder 70

Figure 22:
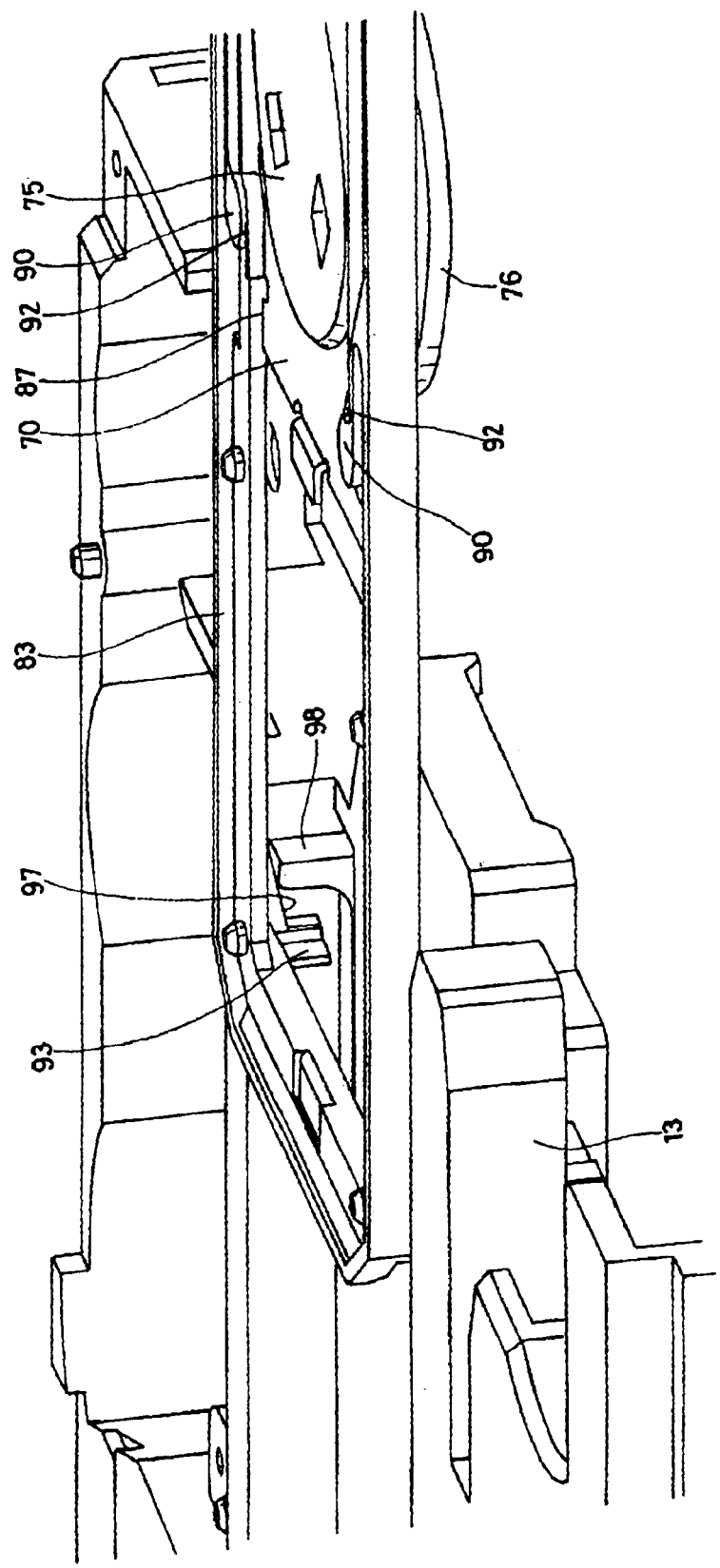
FIG. 22 is a perspective view showing the retractor pull out operation for the tray.
Figure 23:
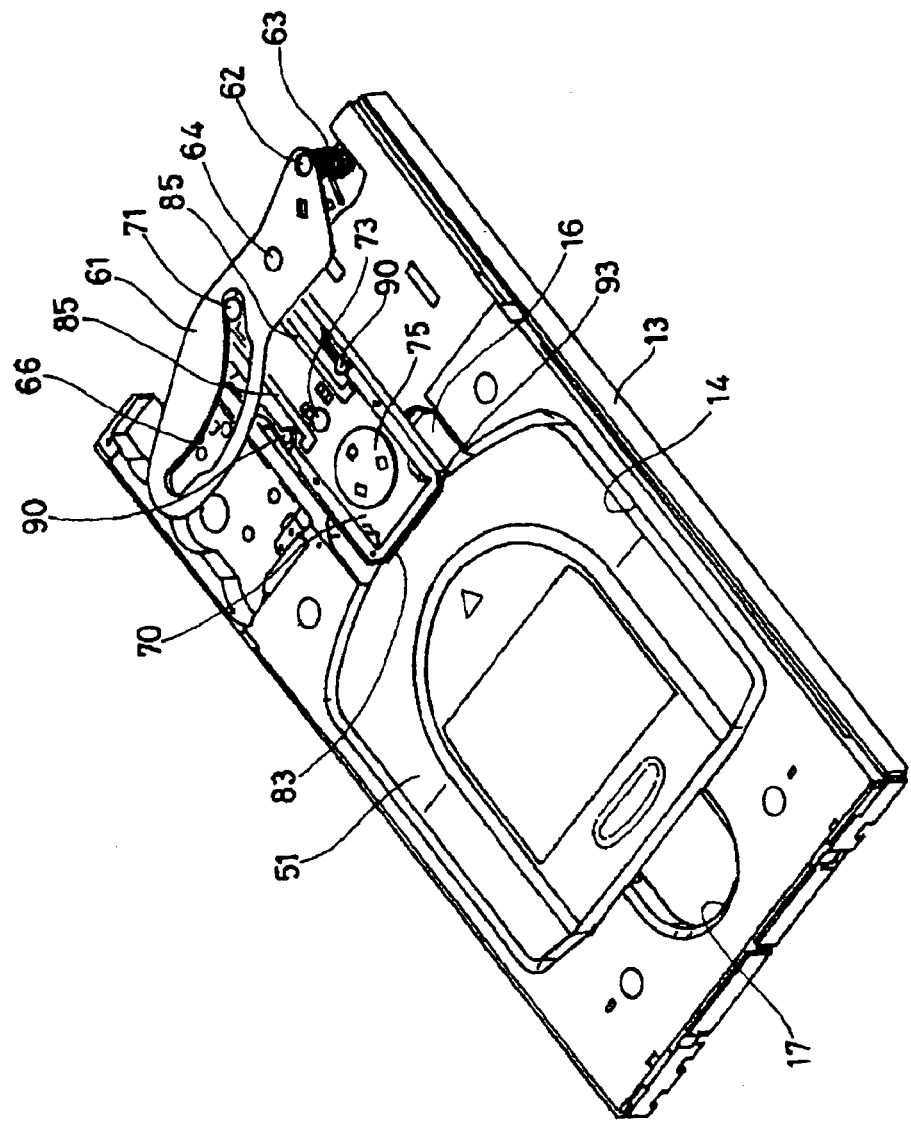
FIG. 23 is a perspective view showing the retractable clamping mechanism when loading of the cartridge is complete.

In the process for ejecting the cartridge 51, the spring force of the torsion coil spring 63 of the drive arm 61 pushes the clamping mechanism back to the forward side specified position as the tray 13 is ejected. After the tray 13 is further ejected, the engaging piece 97 formed on the tray 13 catches the hook 93 of the retractor 83 as shown in FIG. 22, and extends the retractor 83 to the specified position. A slope 97 is formed on the root of the extension hook 93 of the retractor 83 for engaging with the engaging piece of tray 13 since variations or irregularities might occur in the ejection stroke for the tray 13. This slope 97 functions as a limiter on the variations in the ejection stroke. The hook 93 section, which catches the leading edge of retractor 83 of cartridge 51 when the ejection of the tray 13 is complete, is unaffected by variations (irregularities) in the tray 13 ejection stroke and is positioned on the outer circumferential side of the bare disk 52 contour (FIG. 27C).

Working examples of the present invention were described according to the drawings. However, the present invention is not limited to these examples and the technical concepts of the present invention may encompass all types of changes and adaptations. For example, the invention described above relates to an optical disk player for performing recording or reproduction by utilizing an optical pickup to access a disk recording medium comprised of an optical disk. However, the present invention is not limited to a recording and reproduction apparatus utilizing an optical pickup and is widely applicable to all types of disk recording and reproduction apparatus including magneto-optical disks, magnetic disks and electrostatic disks. Also pickups having functions corresponding to the respective recording and reproduction method are of course also applicable to the present invention.

As a major aspect of a disk recording and reproduction apparatus for performing recording and/or reproduction with a pickup while rotating a disk recording medium, this disk recording and reproduction apparatus is comprised of a rotating drive means for driving multiple types of disk record media of different formats and, multiple pickups respectively installed for said multiple types of disk record media of different formats.

The disk recording and reproduction apparatus of this invention therefore drives multiple types of disk recording media of different formats by utilizing a rotating drive means and also performs recording and/or reproduction by means of a corresponding pickup. This device can therefore perform recording and/or reproduction of multiple types of disk media with a minimal structure of mechanism.

In another major aspect of a disk recording and reproduction apparatus for performing recording and/or reproduction with a pickup while rotating a disk recording medium, this disk recording and reproduction apparatus is comprised of an installation means to selectively install a cartridge type disk recording medium and bare disk type recording medium and, a clamping means to clamp the bare disk type recording medium and, a drive means to drive the clamping means when the cartridge type disk recording means has been installed.

Therefore, in this kind of disk recording and reproduction apparatus, the clamping mechanism is moved to a non-operating position when a cartridge type disk recording medium has been loaded. However, when a bare disk type disk recording medium has been loaded, a clamping means reliably clamps this bare disk type disk recording medium and recording and/or reproduction is performed.

What is claimed is:

1. A disk recording and reproduction apparatus for performing recording and/or reproduction with pickup while rotating a disk recording medium, said disk recording and reproduction apparatus comprising:

an installation means for enabling installation of either a cartridge type disk recording medium or bare disk type recording medium;

a clamping means for clamping said bare disk type recording medium; and a drive means for moving said clamping means to a non-operating position when said cartridge type disk recording medium has been installed;

wherein said clamping means has a movable retractor an said installation means pulls said retractor out of said clamping means at a final stroke to eject said cartridge.

2. A disk recording and reproduction apparatus according to claim 1, wherein said cartridge moves said clamping means to a non-operating position by the driving force of said installation means when said cartridge type disk recording medium has been installed.

3. A disk recording and reproduction apparatus according to claim 2, wherein when said cartridge has been ejected, the resilient recovery force of an elastic member is utilized to return said clamping means to the operating position.

4. A disk recording and reproduction apparatus according to claim 8, wherein said installation means has an engaging means with a limiter function, and said retractor is pulled out from said clamping means by said engaging means.

* * * * *

UNITED STATES PATENT AND TRADEMARK OFFICE
CERTIFICATE OF CORRECTION

PATENT NO.    : 6,964,056 B2
DATED         : November 8, 2005
INVENTOR(S)   : Manabu Obata et al.

It is certified that error appears in the above-identified patent and that said Letters Patent is hereby corrected as shown below:

<u>Column 10,</u>
Line 40, change "an" to -- and --.

Signed and Sealed this

Fourth Day of April, 2006

JON W. DUDAS
*Director of the United States Patent and Trademark Office*